(12) United States Patent
Marchan et al.

(10) Patent No.: US 11,832,085 B2
(45) Date of Patent: Nov. 28, 2023

(54) EFFICIENT HRTF APPROXIMATION VIA MULTI-LAYER OPTIMIZATION

(71) Applicant: Microsoft Technology Licensing, LLC, Redmond, WA (US)

(72) Inventors: Mick Kekoa Marchan, Seattle, WA (US); Andrew Stewart Allen, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 17/698,595

(22) Filed: Mar. 18, 2022

(65) Prior Publication Data

US 2023/0300556 A1    Sep. 21, 2023

(51) Int. Cl.
*H04S 7/00* (2006.01)
*H04S 1/00* (2006.01)
*H04R 5/033* (2006.01)
*G06N 20/00* (2019.01)
*G06F 17/14* (2006.01)

(52) U.S. Cl.
CPC ............ *H04S 7/304* (2013.01); *G06F 17/142* (2013.01); *G06N 20/00* (2019.01); *H04R 5/033* (2013.01); *H04S 1/007* (2013.01); *H04S 2400/11* (2013.01); *H04S 2400/13* (2013.01); *H04S 2420/01* (2013.01)

(58) Field of Classification Search
None
See application file for complete search history.

(56) References Cited

PUBLICATIONS

Zhu X et al: "Performanceconparisonof1-35 NeuralnetworksforHRTFsapproximation". High Technology Letters, Science Press, Beijing,CN, vol. 6 No.1, Jan. 1, 2000 (Jan. 1, 2000), pp. 14-17, XP008054262, ISSN: 1006-6748 (Year: 2000).*
Genison R L: "Asphericalbasisfunction1-15 neural network for pole-zero modeling of head-related transfer functions", Applications of Signal Processing to Audto and Acoustics, 1995., NY,USA Oct. 15-18, 1995, New York , Ny USA, IEEE, US, Oct. 15, 1995 (Oct. 15, 1995), pp. 92-95 (Year: 1995).*
Huang, et al., "A Reduced Order Model of Head-Related Impulse Responses Based on Independent Spatial Feature Extraction", In Proceedings of IEEE International Conference on Acoustics, Speech and Signal Processing, Apr. 19, 2009, pp. 281-284.
(Continued)

*Primary Examiner* — Yosef K Laekemariam
(74) *Attorney, Agent, or Firm* — WORKMAN NYDEGGER

(57) ABSTRACT

Techniques for using a network to decompose an HRTF data set to generate approximation data and to render an audio signal using the approximation data are disclosed herein. An input HRTF data set is fed into the network, which then generates approximation data that includes mixing channel gains, FIR filter coefficients, and basis filter shapes. This approximation data controls various components in the network. When the input HRTF data set is fed as input into the network, then the output of the network is an output approximated HRTF data set. The network iteratively fine tunes the approximation data until the output approximated HRTF data set sufficiently matches the input HRTF data set. After the approximation data is sufficiently tuned, the approximation data is later used by the network to render an audio signal.

20 Claims, 14 Drawing Sheets

(56) References Cited

PUBLICATIONS

Jenison, Rick L., "A Spherical Basis Function Neural Network for Pole-Zero Modeling of Head-Related Transfer Functions", In Proceedings of Workshop on Applications of Signal Processing to Audio and Acoustics, Oct. 15, 1995, 4 Pages.
"International Search Report and Written Opinion Issued in PCT Application No. PCT/US2022/053904", dated Apr. 26, 2023, 16 Pages. (MS# 411155-WO-PCT).
Xiaoguang, et al., "Performance Comparison of Neural Networks for HRTFS Approximation", In Journal of High Technology Letters, vol. 6, Issue 1, Jan. 1, 2000, pp. 14-17.
Chen, et al., "A Spatial Feature Extraction and Regularization Model for the Head-Related Transfer Function", In Journal of the Acoustical Society of America, Jan. 1995, pp. 439-452.
Gorzel, et al., "Efficient Encoding and Decoding of Binaural Sound with Resonance Audio", In Proceedings of the AES International Conference on Immersive and Interactive Audio, Mar. 27, 2019, 12 Pages.
Pulkki, Ville, "Virtual Sound Source Positioning Using Vector Base Amplitude Panning", In Journal of Audio Engineering Society, vol. 45, No. 6, Jun. 1997, pp. 456-466.
Zhang, et al., "Platform for Dynamic Virtual Auditory Environment Real-Time Rendering System", In Journal of Chinese Science Bulletin, vol. 58, Issue 3, Jan. 22, 2013, pp. 316-327.
Kistler, et al., "A Model of Head-Related Transfer Functions Based on Principal Components Analysis and Minimum-Phase Reconstruction", in Journal of the Acoustical Society of America, vol. 91, Issue 3, Mar. 1992, pp. 1637-1647.

\* cited by examiner

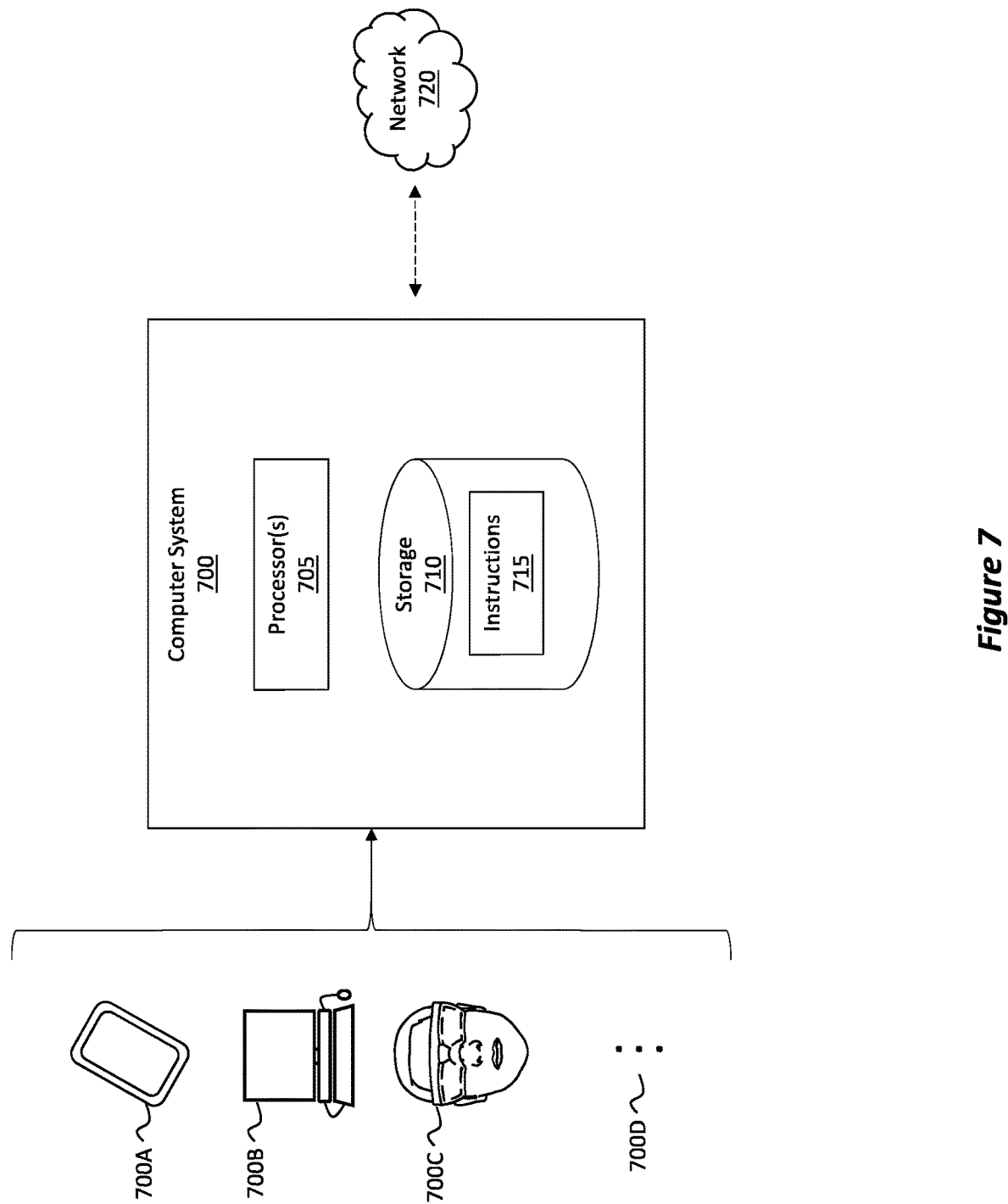

EFFICIENT HRTF APPROXIMATION VIA MULTI-LAYER OPTIMIZATION

BACKGROUND

In the field of spatial audio, a spatializer is an audio rendering component often used in video games and mixed reality (MR) applications. The spatializer adds directionality to a virtual sound source. For binaural spatializers that are meant to be used with headphones, this is accomplished by simulating how sound emitted from a source interacts with the geometry of a listener's head. Because of the computational complexity of the physics involved in that process, binaural spatializers often use pre-made filters called Head Related Transfer Functions (HRTFs) rather than calculating the physics at runtime.

A head-related transfer function (HRTF) is a type of acoustic transfer function that is structured to describe how sound is transferred from a source/position to a human's ear. That is, an HRTF can be used to synthesize an audio signal, which may initially be non-spatial, in a manner so as to generate a spatial audio signal. After the audio signal is synthesized via certain selected HRTFs, the signal can then be played over a set of headphones. The human who is listening to the headphones will perceive the sound as if the sound were actually originating at the source/position as opposed to originating at the headphone speakers. One will appreciate, therefore, how HRTFs can be used in numerous applications, such as three-dimensional (3D) audio for music performances, games (e.g., virtual reality or augmented reality or any type of MR application), live performances, or any other audio and visual scenario.

By way of further explanation, if an HRTF technique is properly implemented, then a system can produce virtual sounds using a set of headphones, where these virtual sounds are entirely indistinguishable from sounds that may otherwise be produced by a speaker that was actually located at a particular position. HRTFs include so-called HRTF "filters" that include a pair of left and right filters. These filters describe how sound should be filtered in order to cause that sound to have the "airs" as being generated at a given position relative to a human listener. HRTF filters essentially rely on the morphology of a human's ear (e.g., the size, dimensions of the internal cavities, etc.) as well as some other physical characteristics of a human's body.

As one can imagine, the use of HRTFs is computationally expensive. Some existing systems are configured to attempt to more efficiently use or approximate the HRTFs.

One such system is the "Virtual Speaker System" or VSS. VSS uses a fixed set of HRTFs, which are chosen to operate as "virtual speakers." What this means is that the VSS system always uses a fixed amount of computation that is spent on filtering. The VSS system also always uses at least some per-source computation in order to mix sound sources to produce the virtual speakers.

Another such system is the "Ambisonics" system. This system decomposes the HRTF dataset using spherical harmonics. Based on this decomposition process, the Ambisonics system can then allow for a fixed amount of computation to be spent on filtering (e.g., about 1-2 filters per spherical harmonic). A certain amount of per-source computation is also required in order to mix sound sources in the Ambisonics format.

Yet another system is the PCA/NMF Decomposition system. Here, an HRTF dataset is decomposed using traditional linear decomposition techniques, such as PCA/NMF. With such techniques, these systems allow for a fixed amount of computation to be spent on filtering and a certain amount of per-source computation, which is used to mix sound sources into the basis channels and to apply additional effects (e.g., delay).

With current networks/systems used to synthesize audio signals, there is always a 1:1 mapping between mixing channels and basis filters. What this means is that in order to increase accuracy, the traditional systems are required to increase both the number of mixing channels and the number of basis filters. Because each basis filter includes a corresponding Fast Fourier Transform (FFT), which consumes a relatively high amount of compute, the traditional systems are still computationally expensive. Furthermore, in order for traditional systems to improve their accuracies, those system have to increase their number of basis filters, thereby also resulting in significant increases to their compute requirements.

Additionally, the use of HRTFs can hit CPU budget issues in scenarios where there are multiple simultaneously spatialized sound sources (e.g., multiple holograms or visualizations, with each visualization having its own respective sound that needs to be played at a particular source or perhaps at a location on a sound sphere). This is because the spatializer must apply the appropriate HRTF to each source, which has a considerable computational cost per-source. Since games and MR experiences often have a large and dynamic number of sound sources, predicting and constraining the spatialization cost can be problematic. This problem is made even worse as applications move onto low-compute devices such as phones or tablets. This problem is also present on devices that run on batteries, such as head mounted devices (HMDs).

Therefore, although existing systems are in place for attempting to approximate HRTFs, there is still a substantial need to improve how sound is synthesized and to reduce the level of compute required for the synthesis. Indeed, as more devices are being used to synthesize sound, there will be an ever increasing need to improve how the sound is synthesized. Some of these devices have limited compute abilities and perhaps even limited power supplies. What is needed, therefore, is a scalable and dynamic technique for synthesizing sound.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods that decompose an HRTF data set to generate approximation data. The approximation data can then be used to render an audio signal.

That is, the embodiments can approximate HRTF filters in order to reduce a per-source rendering cost when subsequently rendering an audio signal. Such embodiments comprise a perceptual decomposition process in which an input HRTF data set is fed as input into a network and is used to generate approximation data (e.g., mixing channel gains, finite input response (FIR) filter coefficients, and basis filter shapes). The approximation data (e.g., the mixing channel gains, the FIR filter coefficients, and the basis filter shapes) drive various components in the network. When the input HRTF data set is fed as input into the network (e.g., during the decomposition process) and when the approximation data drives the network's components, the network generates output approximated HRTF data. The network iteratively fine-tunes the approximation data until the output approximated HRTF data sufficiently matches the input HRTF data. Once there is a sufficient match between the output approximated HRTF data and the input HRTF data, then the approximation data is considered to be sufficiently fine-tuned. Notably, each source will have its own corresponding set of approximation data, which is generated by the network. Once the approximation data is fine-tuned, the embodiments set a 1:1 correlation between specific values of the approximation data and specific positions or sources. That is, each position or source is now associated with a specific set of approximation data, which can later be used to render an audio signal that is associated with a particular source/location.

In some embodiments, the perceptual decomposition process includes providing the input HRTF data set as input into the network. Notably, the network includes basis filters that comprise mixing channels, finite input response (FIR) filters, and FFTs. Furthermore, the input HRTF data set includes a corresponding set of HRTF filters for each location in a set of locations. For each respective location in the set of locations, the embodiments cause the network to use the input HRTF data set to iteratively learn approximation data, which includes the following: (i) corresponding mixing channel gains that are used to control input to the mixing channels, (ii) coefficients that are used to control the FIR filters, and (iii) shapes of the basis filters. Notably, specific combinations of mixing channel gains, coefficients, and linear combinations of outputs from the basis filters cause the network to generate an output that corresponds to the input HRTF data set. To be clear, the output is an output approximated HRTF data set. Additionally, the iterative learning attempts to minimize an error metric between the output approximated HRTF data set and the input HRTF data set by iteratively modifying the approximation data. The embodiments store a 1:1 correlation between each of the locations and specific values selected from the approximation data. By subsequently selecting a particular location, a corresponding set of values from the approximation data are also selected. These corresponding set of values include specific mixing channel gains, the coefficients, and the basis filter shapes. When selecting a particular location, the values that are specific to that location include the mixing channel gains. The FIR coefficients and the basis filters can remain constant regardless of position.

Some embodiments are directed to rending an audio signal using approximation data that was generated during a perceptual decomposition process in which a head related transfer function (HRTF) data set was decomposed.

Such embodiments access approximation data that is used to drive components of a network. The approximation data was generated via an iterative learning process in which an input HRTF data set was fed as input into the network and in which the approximation data was used by the network to generate an output approximated HRTF data set. The approximation data was iteratively fine-tuned by the network until an error metric between the output approximated HRTF data set and the input HRTF data set was below an error threshold. The approximation data includes (i) mixing channel gains that are used to control mixing channels of the network, (ii) coefficients that are used to control finite input response (FIR) filters of the network, and (iii) shapes of basis filters of the network. The embodiments perform a rendering process to render an input audio signal for playback over a pair of speakers. The input audio signal is fed as input into the network. The rendering process includes determining that the input audio signal is to be played as if a sound for the input audio signal is originating at a specific location. The rendering process further includes using the specific location to select a set of mixing channel gains from the approximation data. The rendering process further includes applying the set of mixing channel gains to the input audio signal to generate a set of mixing channel outputs, which will be further fed through each basis filter that is included in the network. The rendering process further includes applying the coefficients to the FIR filters in the network. The FIR filters operate as prefilters for Fast Fourier Transforms (FFTs) included in the basis filters such that the input audio signal is prefiltered prior to being operated on by the FFTs. The rendering process further includes applying the FFTs of the basis filters to the input audio signal after the FIR filters have operated on the input audio signal. The rendering process further includes linearly combining outputs generated by a first set of the basis filters to generate a first output signal and linearly combining outputs generated by a second set of the basis filters to generate a second output signal. The embodiments also play a sound over the pair of speakers using the first output signal and the second output signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates an example computer system capable of performing any of the disclosed operations.

DETAILED DESCRIPTION

Figure 1:
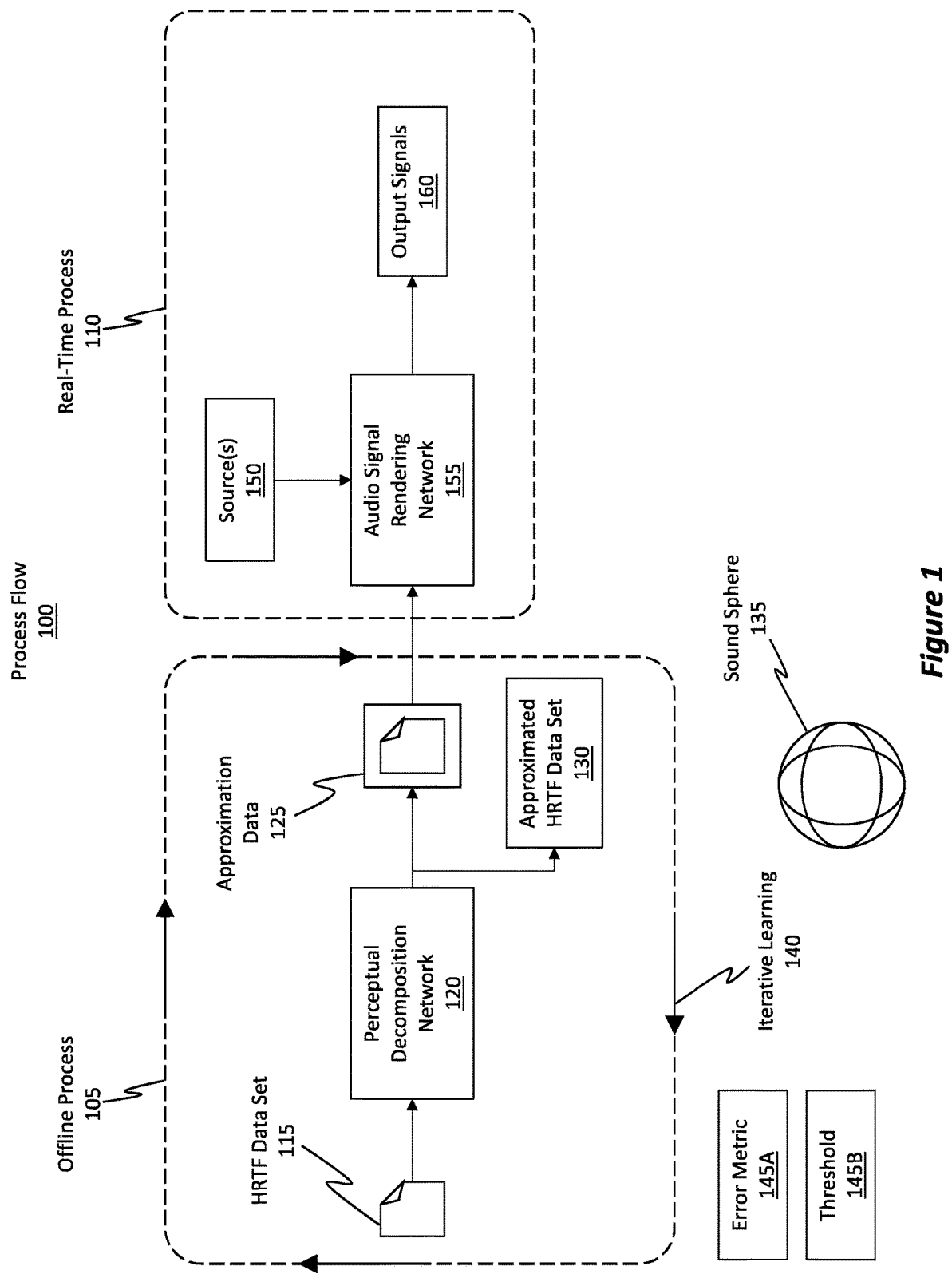
FIG. 1 illustrates a network that receives, as input, an HRTF data set and that generates approximation data that can be used to generate an approximated HRTF data set. The network can also be used to render an audio signal after the approximation data is generated.

Embodiments disclosed herein relate to systems, devices, and methods that decompose an HRTF data set to generate approximation data. The approximation data can then be used to render an audio signal.

That is, the embodiments can approximate HRTF filters in order to reduce a per-source rendering cost when subsequently rendering an audio signal. Such embodiments comprise a perceptual decomposition process in which an input HRTF data set is fed as input into a network and is used to generate approximation data (e.g., mixing channel gains, finite input response (FIR) filter coefficients, and basis filter shapes). The approximation data (e.g., the mixing channel gains, the FIR filter coefficients, and the basis filter shapes) drive various components in the network. When the input HRTF data set is fed as input into the network (e.g., during the decomposition process) and when the approximation data drives the network's components, the network generates output approximated HRTF data. The network iteratively fine-tunes the approximation data until the output approximated HRTF data sufficiently matches the input HRTF data. Once there is a sufficient match between the output approximated HRTF data and the input HRTF data (e.g., perhaps at a selected frequency or perhaps over a selected frequency range), then the approximation data is considered to be sufficiently fine-tuned. Notably, each source/location will have its own corresponding set of approximation data, which is generated by the network. Once the approximation data is fine-tuned, the embodiments set a 1:1 correlation between specific values of the approximation data and specific positions/sources. That is, each position is now associated with a specific set of approximation data, which can later be used to render an audio signal that is associated with a particular source/location.

In some embodiments, the perceptual decomposition process includes providing the input HRTF data set as input into the network. Notably, the network includes basis filters comprising mixing channels, finite input response (FIR) filters, and FFTs. Although reference is made herein to a basis filter including mixing channels, FIR filters, and FFTs, in some embodiments the mixing channels, FIRs, and FFTs can be distinct network components in the network. In any event, regardless of the network structure, reference to a basis filter can also include a reference to the frequency magnitude of that basis filter such that "basis filter" or "frequency magnitude of the basis filter" can be interchangeable with one another.

Furthermore, the input HRTF data set includes a corresponding set of HRTF filters for each location in a set of locations. For each respective location in the set, the embodiments cause the network to use the input HRTF data set to iteratively learn approximation data, which includes the following: (i) corresponding mixing channel gains that are used to control input to the mixing channels, (ii) coefficients that are used to control the FIR filters (which can be static), and (iii) shapes of the basis filters. Notably, specific combinations of mixing channel gains, coefficients, and linear combinations of outputs from the basis filters cause the network to generate an output that corresponds to the input HRTF data set. Specifically, the output is an output approximated HRTF data set. Additionally, the iterative learning attempts to minimize an error metric between the output approximated HRTF data set and the input HRTF data set (e.g., either at a particular frequency or across a selected frequency range) by iteratively modifying the approximation data. The embodiments store a 1:1 correlation between each location and specific values selected from the approximation data. By subsequently selecting a particular location, a corresponding set of values from the approximation data are also selected. These corresponding set of values include specific mixing channel gains, the coefficients, and the basis filter shapes. When selecting a particular location, the values that are specific to that location include the mixing channel gains. The FIR coefficients and the basis filters can remain constant regardless of position.

Some embodiments are directed to rending an audio signal using approximation data that was generated during a perceptual decomposition process in which a head related transfer function (HRTF) data set was decomposed.

Such embodiments access approximation data that is used to drive components of a network. The approximation data was generated via an iterative learning process in which an input HRTF data set was fed as input into the network and in which the approximation data was used by the network to generate an output approximated HRTF data set. The approximation data was iteratively fine-tuned by the network until an error metric between the output approximated HRTF data set and the input HRTF data set was below an error threshold (e.g., either at a particular frequency or across a selected frequency range). The approximation data includes (i) mixing channel gains that are used to control mixing channels of the network, (ii) coefficients that are used to control finite input response (FIR) filters of the network, and (iii) shapes of basis filters of the network. The embodiments perform a rendering process to render an input audio signal for playback over a pair of speakers. The input audio signal is fed as input into the network. The rendering process includes determining that the input audio signal is to be played as if a sound for the input audio signal is originating at a specific location, such as perhaps one that is located on a sound sphere. Although the remaining examples are focused on selecting locations on a sound sphere, one will appreciate how the principles can be expanded to include other sized spheres, or rather, other distances relative to a human listener. Accordingly, use of the sound sphere is for example purposes only.

The rendering process further includes using the specific location to select a set of mixing channel gains from the approximation data. The rendering process further includes applying the set of mixing channel gains to the input audio signal to generate a set of mixing channel outputs, which will be further fed through each basis filter that is included in the network. The rendering process further includes applying the coefficients to each of the FIR filters in the network. The FIR filters operate as prefilters for Fast Fourier Transforms (FFTs) included in the basis filters such that the input audio signal is prefiltered prior to being operated on by the FFTs. The FIR filters can be static, such as by always using the same coefficients to drive the FIR filters.

The rendering process further includes applying the FFTs of the basis filters to the input audio signal after the FIR filters have operated on the input audio signal. The rendering process further includes linearly combining outputs generated by a first set of the basis filters to generate a first output signal and linearly combining outputs generated by a second set of the basis filters to generate a second output signal. The embodiments also play a sound over the pair of speakers using the first output signal and the second output signal.

Examples Of Technical Benefits, Improvements, And Practical Applications

The following section outlines some example improvements and practical applications provided by the disclosed embodiments. It will be appreciated, however, that these are just examples only and that the embodiments are not limited to only these improvements.

The disclosed embodiments are beneficially configured to use a network to decompose an HRTF data set in order to produce approximation data (e.g., gains, coefficients, and basis filter shapes), which is used to drive the network. During the decomposition process, the network uses the approximation data to operate on an input HRTF data set, thereby producing an output approximated HRTF data set. Initially, a default set of approximation data may be used. The network then, however, iteratively fine tunes the approximation data until the output approximated HRTF data set sufficiently matches the input HRTF data set. The match can occur at a specific frequency or perhaps over a desired frequency range. Beneficially, the approximated data is much sparser, or rather much more compact, relative to actual HRTF filters. As such, significantly less compute is expended when using the approximated data to subsequently render an input audio signal as compared to using actual HRTF filters to render the same audio signal. While the approximation data being compact does help compute performance due to cache efficiency, another substantial benefit includes the ability of the embodiments to shift most of the processing power to be spent on a fixed-cost part of the rendering network, which means the per-source compute is cheaper and scales better as the number of sources increases.

By practicing the disclosed principles, each "position," "location," or "source" along a sound sphere can now be provided with a corresponding set of approximation data that can be used to drive the network when rendering an input audio signal. That is, when the network is configured using specific values from the approximation data, the embodiments can render an input audio signal in an efficient manner without having to use actual HRTF filters. Thus, significant savings are achieved in terms of compute expenditure.

Stated differently, each position in the sound sphere now has a 1:1 correlation with a corresponding set of approximation values. When the network is configured with these approximation values, the network will operate in a manner that effectively mimics how HRTF filters operate, but the network consumes less processing power because of its simplicity relative to actual HRTF filters. Through the disclosed techniques, the network consumes less processing power when spatializing many sources simultaneously, as the per source compute cost is greatly reduced.

While existing techniques are in place for decomposing HRTF filters, the disclosed embodiments are unique in how the decomposition process is performed, specifically with regard to how the filters are derived, or rather, in how the values that drive the filters are derived. For instance, both the VSS and Ambisonics techniques rely on panning laws and predefined mixing matrices that have no knowledge of the underlying shape of the HRTF dataset. This is largely because these techniques incorporate multi-channel formats that are defined in a way that supports playback over speakers.

The disclosed embodiments, on the other hand, specifically target binaural rendering and do not pre-define the mixing matrix. By doing so, the embodiments allow the minimization routine to find a more compact representation of the ground truth HRTF dataset. Relative to VSS and Ambisonics, the disclosed operations allow for fewer filtering operations for identical levels of accuracy. Furthermore, the disclosed embodiments derive their approximation data directly from an HRTF data set, which is in contrast to traditional derivation and decomposition techniques.

The disclosed network also encapsulates both the basis filters and the mixing channel filters (e.g., the mixing channels, which include the attached FIR filters). Doing so provides additional degrees of freedom and allows the disclosed decomposition step to derive a more compact approximation of the ground truth HRTF dataset.

Another major benefit of the disclosed solutions relates to the structure of the network used in the perceptual decomposition step. Although other networks may make use of per-source filters, mixing matrices, and gain tables, their decomposition does not allow them to have independent mixing matrices for each mixing channel filter to mix into a shared set of basis filters. The disclosed embodiments do provide for that functionality (e.g., independent mixing matrices for each mixing channel filter). Stated differently, while some other techniques might have per-source filters (e.g. direct HRTF rendering where filtering is done on a per-source basis rather than grouped together in a fixed pipeline), those other techniques use a mixing matrix and basis filters to approximate an HRTF dataset (e.g., Ambisonics and VSS). In these techniques that use a mixing matrix and set of basis filters (such as Ambisonics and VSS), they can be notated as $H_i(z) \cong M_i B(z)$, where $H_i(z)$ is the ith HRTF at frequency z, M is the mixing matrix, and N is the number of basis filters, B. Another way of formulating this is $H_i(z) \cong \Sigma_n^N M_{i,n} * B_n(z)$. Notably, however, no traditional technique does a multi-layered decomposition where the HRTF dataset is decomposed as a set of chained-linear combinations, with both mixing channel filters and basis filters. This can be notated as $H_i(z) \cong \Sigma_n^N B_n(z) * \Sigma_k^K M_{i,n,k} * F_{n,k}(z)$, where K is the number of mixing channel filters, F, per basis filter. The disclosed embodiments do perform such decompositions. This functionality effectively multiplies the explanatory power of each basis filter by the number of mixing channel filters per basis filter, allowing HRTF approximations that are both highly accurate and run-time efficient in multi-source scenarios. Note that this technique can be extended to handle unequal numbers of mixing channel filters for each basis filter.

With the disclosed techniques, there is a singular mixing matrix (e.g., at this HRTF position, the embodiments apply a selected set of gains to a signal when mixing into the mixing channels). Other techniques, however, have a 1:1 correlation between mixing channels and basis filters. The disclosed technique can have more mixing channels than basis filters because they can beneficially apply a mixing channel filter (i.e. a mixing channel with an attached FIR filter) at the end of the mixing channel. The output of that mixing channel filter is summed (in sets per-basis filter), and then fed into the basis filters. Because the embodiments perform this mixing channel filtering plus summing operation, the embodiments can beneficially morph the spectral shape of the input to the basis filters in a way that other techniques cannot (e.g., they can only scale the input to the basis filter with a gain). For these reasons, the embodiments perform what is called a "multi-layer optimization." The first layer scales the input differently for each mixing channel and sends it to the mixing channel. Then, those mixing channels have mixing channel filters applied in the time domain (i.e. FIR filtering). Next, the outputs of the mixing channels are summed in sets belonging to specific basis filters. The second layer starts at the basis filters. The second layer takes the summed mixing channel outputs and applies the respective basis filter. The outputs of the basis filters are summed together to get an approximated HRTF. Other techniques are "one layer", because they scale input differently for each mixing channel and send that scaled input directly to the basis filters.

Yet another major advantage of the disclosed techniques over traditional HRTF renderers is that the disclosed embodiments allow shifting a considerable amount of per-source rendering cost onto a fixed bed of filters (e.g., the basis filters). This means that spatialization cost grows at a much slower rate relative to the number of sound sources, which makes it easier for sound designers to stay within the constraints of their compute budgets. Additionally, due to using a fixed set of basis filters, the disclosed techniques are extremely memory and cache efficient. Simultaneously, these advantages come with little perceptual difference from what would otherwise be generated if the ground truth HRTF dataset were instead used to render a signal.

The disclosed embodiments also beneficially resolve the issue of expensive spatialization in multi-source scenarios. In particular, the embodiments are directed to a binaural spatialization technique that closely approximates the perceptually relevant cues of a given ground truth HRTF dataset while reducing the per-source rendering cost. In this context, the perceptually relevant cues of an HRTF dataset are the cues that aid sound localization (e.g., interaural time delay, interaural intensity difference, head shadowing, etc.) as well as the perceived coloration of the HRTF. As will be described in more detail later, to compactly approximate these cues, there are two steps: step 1 includes perceptually decomposing the ground truth HRTF dataset offline to generate approximation data and step 2 includes using the approximation data to render an input audio signal in real-time and in a manner that avoids having to use actual HRTF filters to render the audio signal.

It should also be noted how the disclosed spatializers are not strictly limited to spatializing a source on a sphere. They can also simulate sources getting closer or further from a listener. While a majority of the examples provided herein spatialize source on a sphere, there is nothing limiting the disclosed embodiments from approximating sources at different distances relative to the human listener. Furthermore, some existing techniques (e.g., like VSS and Ambisonics) can, in some instances, be scalable. Notably, however, the ability to scale using those techniques comes at a significant perceptual cost in that they sound different relative to the HRTF dataset. The disclosed techniques, on the other hand, are beneficially scalable and achieve higher accuracy than the traditional techniques when comparing identical compute costs.

Example Process Flow

Having just described some of the high-level benefits provided by the disclosed embodiments, attention will now be directed to FIG. 1, which illustrates a process flow 100 for achieving the disclosed benefits. The process flow 100 generally includes two processes, as show by the offline process 105 and the real-time process 110.

The offline process 105 refers to a perceptual decomposition process in which an HRTF data set is used by a network to derive approximation data (e.g., mixing channel gains, coefficients, and basis filter shapes). By "offline," it is meant that the offline processes can be performed at any time prior to when an audio signal is to be rendered.

The approximation data is iteratively fine-tuned by the network until an output of the network (e.g., an output approximated HRTF data set) sufficiently matches the input HRTF data set. The match between the two data sets can be set to occur at a particular frequency or, alternatively, can be set to occur across a range of frequencies.

That is, the embodiments attempt to minimize some loss function (or error metric). This does not necessarily mean that the magnitudes at a particular frequency match between the approximation and the ground truth (although it is desired that they will be close). The iterations stop when the error metric has converged to some value, meaning tuning the values any more will result in the network giving worse approximations.

Once the approximation data is sufficiently tuned, then it can be used during the real-time process 110. By "sufficiently tuned," it is meant that an error metric between the two data sets is below a threshold level.

That is, during the real-time process 110, the approximation data is used to drive a network to enable the network to render an input audio signal without having to use actual HRTF filters to render the signal. As such, the offline process 105 is a preparatory step that is performed prior in time to when an audio signal is to be rendered. The real-time process 110, on the other hand, is performed in real-time and uses the approximation data that was previously generated in order to render an audio signal.

The offline process 105 includes accessing an HRTF data set 115 and providing that HRTF data set 115 as input into a perceptual decomposition network 120. This network will be discussed in more detail shortly. The network operates on the HRTF data set 115 to generate a set of approximation data 125. This approximation data 125 includes certain mixing channel gains that are used to control input into a set of mixing channels of the network. The approximation data 125 further includes coefficients that are used to control finite input response (FIR) filters of the network. The approximation data 125 also includes shapes of basis filters that are also used by the network.

When the HRTF data set 115 is fed as input into the perceptual decomposition network 120, the network not only generates the approximation data 125, but the network also generates an output approximated HRTF data set 130. As will be described in more detail shortly, the perceptual decomposition network 120 is configured to iteratively modify the approximation data 125 until the output approximated HRTF data set 130 sufficiently matches the HRTF data set 115.

With that understanding, some additional explanation on HRTFs is warranted. Consider, for example, a sound sphere 135. The sound sphere 135 represents a sphere that can be located around a human user's head. HRTFs are designed to portray or render sound as if that sound was actually emanating or originating from a particular source, position, or location on the sound sphere 135 even though the sound is actually emanating from a pair of speakers next to the user's ears. In accordance with the disclosed principles, the embodiments are able to generate a specific set of approximation data for every point, source, location, or position on the sound sphere 135.

Notably, as shown by the arrows representative of the iterative learning 140, the offline process 105 is an iterative process in that it is performed any number of times until a desired outcome is achieved. In this case, the desired outcome is that an error metric 145A between the output approximated HRTF data set 130 and the HRTF data set 115 is less than an error threshold 145B. That is, the iterative learning 140 process can be performed 1, 2, 3, 4, 5, or any number of times until the desired error metric 145A is achieved. The threshold 145B can be triggered or evaluated for a particular frequency where the two data sets are to match or, alternatively, the threshold 145B can be triggered or evaluated for a range of frequencies where the two data sets are to match.

In some cases, before the optimization, the value for the error metric might not be known beforehand to determine when the data sets have sufficiently converged (e.g., when the network is tuned as best as it can be tuned). Therefore, in some cases, a threshold value might not be used to control the termination of the iterative learning process. If the network is configured to be relatively small (e.g., only one mixing channel and basis filter), then the resulting error will likely be relatively higher because the network might not be capable of accurately approximating the entire HRTF dataset. Accordingly, in such scenarios where a threshold is not used, the network stops when the error is observed as not improving anymore (e.g., over a determined period of time, the rate of change is 0 or some other selected value) when the learning process attempts to continue to tune it, thereby indicating that convergence has been reached.

As mentioned previously, the approximation data 125 includes a set of gains (e.g., mixing channel gains), coefficients, and basis filter shapes that are used to drive various components of the perceptual decomposition network 120. These various pieces of approximation data can be iteratively modified until the resulting error metric 145A satisfies the threshold 145B requirement. Further details on this iterative process will be provided later.

After the HRTF data set 115 is decomposed and the approximation data 125 is generated, that approximation data 125 (e.g., the gains, coefficients, and basis filter shapes) can then be used during the real-time process 110, which generally refers to an audio signal rendering process. For example, suppose one or more sounds are desired to be played at one or more source(s) 150 along the sound sphere 135. The embodiments feed the source(s) 150 as well as selected approximation data (i.e. the specific approximation data that is specific to the location of the source(s) 150 on the sound sphere 135) into the audio signal rendering network 155, which is similar to the perceptual decomposition network 120. That is, the perceptual decomposition network 120 is configured specifically to perform the iterative learning process while the audio signal rendering network 155 is configured specifically to perform real-time rendering. Various configuration optimizations are provided in each network to ensure each network performs its intended duties.

The audio signal rendering network 155 then processes these inputs and generates output signals 160, which include a left ear output signal and a right ear output signal. The left ear output signal can be played in a left speaker (e.g., perhaps of an HMD, a gaming console headset, or some other speaker system), and the right ear output signal can be played in a right speaker (e.g., of the HMD, the gaming console, or the other speaker system). Notably, the audio signal rendering network 155 uses the approximation data 125 to generate output signals that effectively mimic an output signal that would have been generated if HRTF filters were used (e.g., at a particular frequency or across a range of frequencies). The approximation data 125, however, is much sparser relative to the HRTF data set 115 such that use of the approximation data 125 by the audio signal rendering network 155 to render an audio signal consumes relatively less compute as compared to a scenario where actual HRTF filters are used to render the same audio signal.

Example Decomposition Network

FIGS. 2A-2E illustrate supplemental information as well as various views of an example network that can be used as the perceptual decomposition network 120 from FIG. 1. Recall, the perceptual decomposition network 120 can also be used as the audio signal rendering network 155. Thus, the network shown in FIGS. 2A-2E can be used as both the perceptual decomposition network 120 and the audio signal rendering network 155.

Although the illustrated network is shown as having specific numbers of components (e.g., mixing channels, FIR filters, basis filters, etc.), one will appreciate how the network is scalable and dynamic. Indeed, the disclosed networks can be modified to accommodate various configurations and sizes. As such, the illustrations are provided for example purposes only and should not be construed as being binding in terms of size or complexity.

Figure 2A:
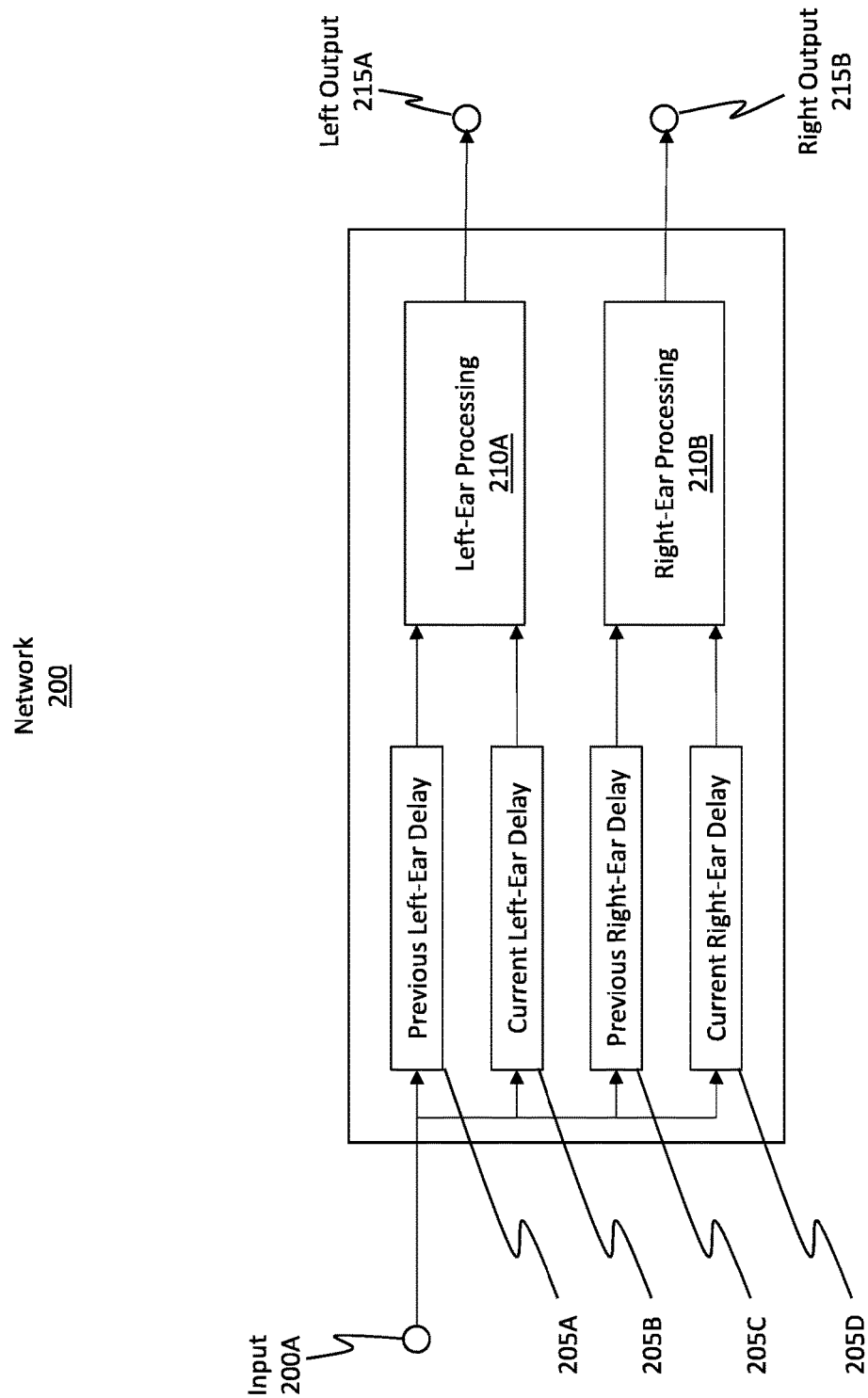
FIGS. 2A, 2B, 2C, 2D, and 2E illustrate various granular views of respective portions of the network and supplemental information.

FIG. 2A illustrates an example network 200, which is representative of the audio signal rendering network 155 from FIG. 1. The perceptual decomposition network 120 is similar, but includes some various differences. For instance, the perceptual decomposition network 120 does not include the crossfading components nor does it include components to handle current ear delays/gains. An input 200A is shown as being fed into the network 200. When configured properly (as described above), the network 200 can be used to decompose an HRTF data set. As such, the input 200A, in some implementations, can represent an HRTF data set.

The network 200 includes a set of delays, as shown by previous left-ear delay 205A, current left-ear delay 205B, previous right-ear delay 205C, and current right-ear delay 205D. These delays are provided because a human's ears are physically separated in space by the head. Consequently, the path lengths that sound will travel will be different for the different ears, and the delays are provided to accommodate those paths lengths.

The network 200 also includes a left-ear processing 210A node and a right-ear processing 210B node. Further details on these nodes will be provided momentarily.

The output of the network 200 is shown as the left output 215A and the right output 215B. When the input HRTF data set is provided as the input 200A, then the outputs of the network 200 will be an output approximated HRTF data set that is designed to mimic the input HRTF data set (i.e. the input 200A).

Beneficially, the network 200 is designed to minimize an error metric that exists between the output approximated HRTF data set and the input HRTF data set. The network 200 minimizes this error metric via the iterative learning process in which the approximation data (e.g., the mixing channel gains, coefficients, and basis filter shapes) are iteratively modified over time in order to reduce the amount of error between the actual input HRTF data set and the output approximated HRTF data set (e.g., the error is minimized at a particular frequency or perhaps across a desired range of frequencies).

Later, when an actual audio signal is fed as input into the network 200 (i.e. during the rendering process, or rather, during the real-time process 110 of FIG. 1), then the left output 215A and the right output 215B will be audio signals that can be played in a pair of speakers to produce a sound. During the decomposition process, however, the network 200 is used to generate an output approximated HRTF data set that is repeatedly worked on or generated by the network (e.g., using the approximation data) until the output approximated HRTF data set sufficiently matches the input HRTF data set.

Figure 2B:
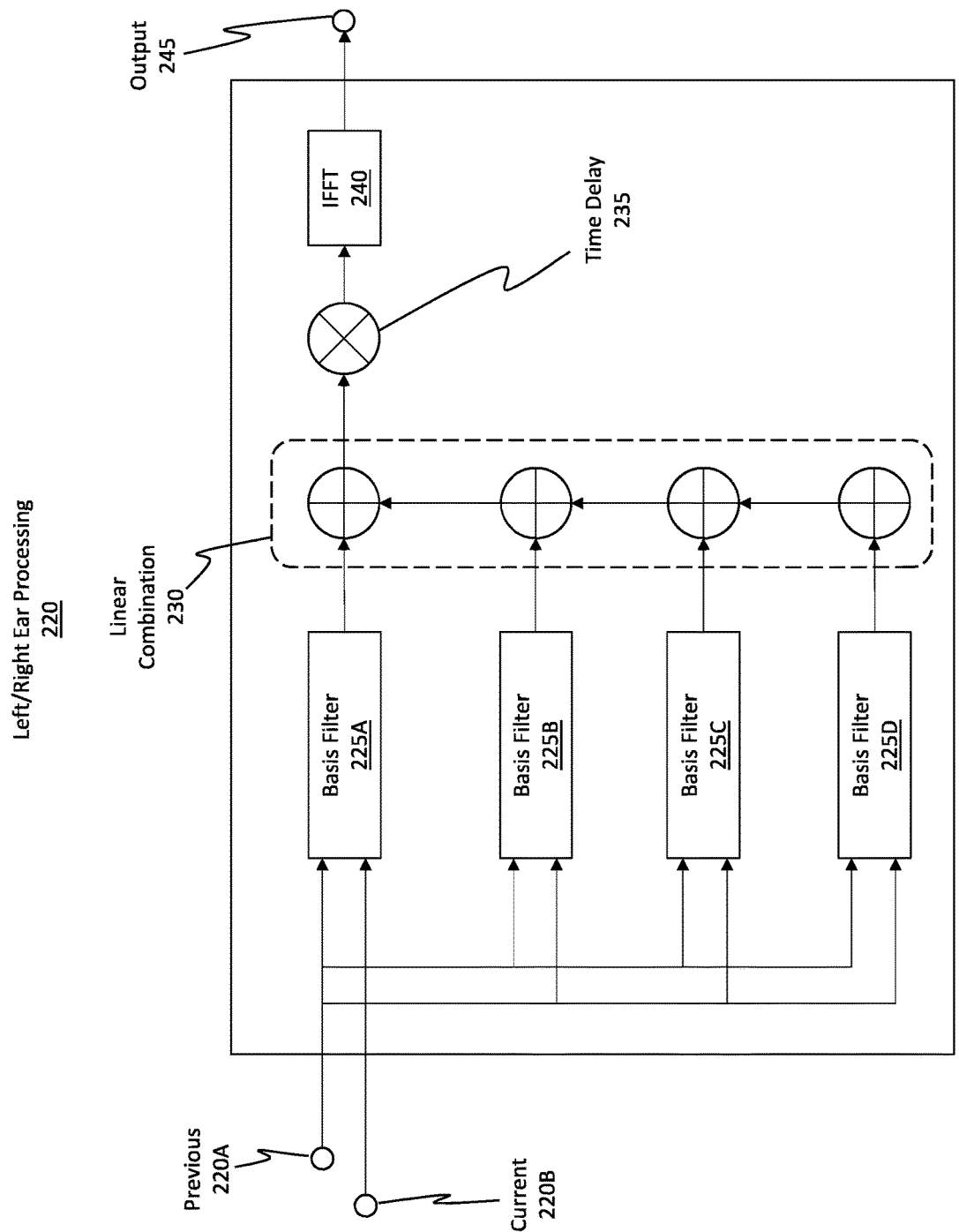

FIG. 2B illustrates a left/right ear processing 220 node, which is representative of any of the left-ear processing 210A or the right-ear processing 210B of FIG. 2A. The inputs to the left/right ear processing 220 node include the previous 220A input and the current 220B input. The previous 220A input represents one of the outputs from the previous left-ear delay 205A or, alternatively, the previous right-ear delay 205C. Similarly, the current 220B input represents one of the outputs from the current left-ear delay 205B or, alternatively, the current right-ear delay 205D.

The previous 220A input and the current 220B input are fed into a set of basis filters 225A, 225B, 225C, and 225D. In this example implementation, there are four basis filters, but one will appreciate how this number is scalable. Further details on the basis filters will be provided later. Notably, however, each basis filter includes a Fast Fourier Transform (FFT), which transforms the audio signal from a time domain into a frequency domain. The left/right ear processing 220 node then linearly combines the outcomes from the basis filters, as shown by linear combination 230. That is, the outputs of the basis filters can be linearly combined in the frequency domain because the basis filters transformed the signals into the frequency domain via their respective FFTs. The signal is then subjected to a time delay 235. Optionally, this time delay can be removed and incorporated in the basis filter stage to produce a similar output. The signal is then converted back into the time domain using an inverse FFT (IFFT), as shown by IFFT 240, to thereby produce an output 245. The output 245 is representative of any one of the left output 215A from FIG. 2A or the right output 215B.

Figure 2C:
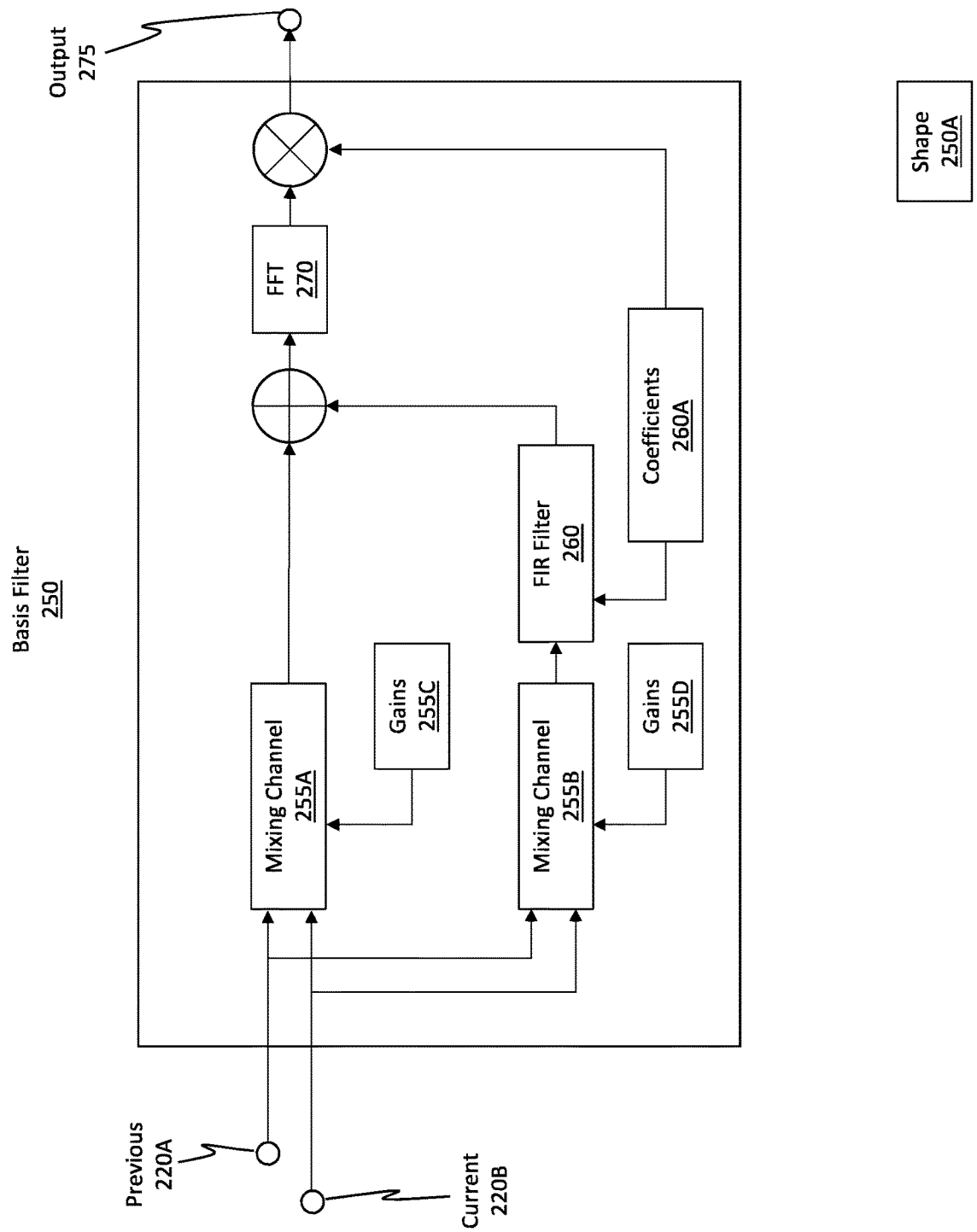

FIG. 2C illustrates the basis filters in a more granular manner. Specifically, FIG. 2C shows a basis filter 250, which is representative of any of the basis filters 225A, 225B, 225C, or 225D from FIG. 2B.

The previous 220A input and the current 220B input are fed into the basis filter 250. The basis filter 250 includes a mixing channel 255A and a mixing channel 255B. One will appreciate, however, how any number of mixing channels can be provided due to the scalability of the network. Further details on the mixing channels will be provided momentarily. A set of mixing channel gains 255C, which is included in the approximation data, drives or controls the mixing channel 255A. Similarly, a set of mixing channel gains 255D, which is also included in the approximation data, drives or controls the mixing channel 255B.

The output of the mixing channel 255B is fed into a finite input response (FIR) filter 260, which is controlled by a set of coefficients 260A that are included in the approximation data. Then, the output from the mixing channel 255A and the output from the FIR filter 260 are added together and then passed through an FFT 270. The output from the FFT 270 can be time delayed to then produce the output 275. In this figure, there is a multiplication stage after the FFT 270. After the FFT 270, the network can scale the frequency magnitudes by the basis filters that were derived in the decomposition step. This convolution can also be driven by the coefficients 260A. The output 275 will be linearly combined with the outputs from the other basis filters. Notably, each basis filter has a corresponding shape 250A.

Notably, an ideal filter would operate in a manner so as to have unit gain (0 dB) in its pass band. The ideal filter would also have a gain of zero (-infinity dB) in its stop band. Between the pass band and the stop band, the filter would have no indecision and would effectively transition from 0 dB to -infinity dB asymptotically. That is not the case, however, with actual filters. The shape 250A, therefore, represents the actual filtering characteristics of the basis filter 250, including its gain in its pass band and its gain in its stop band.

Figure 2D:
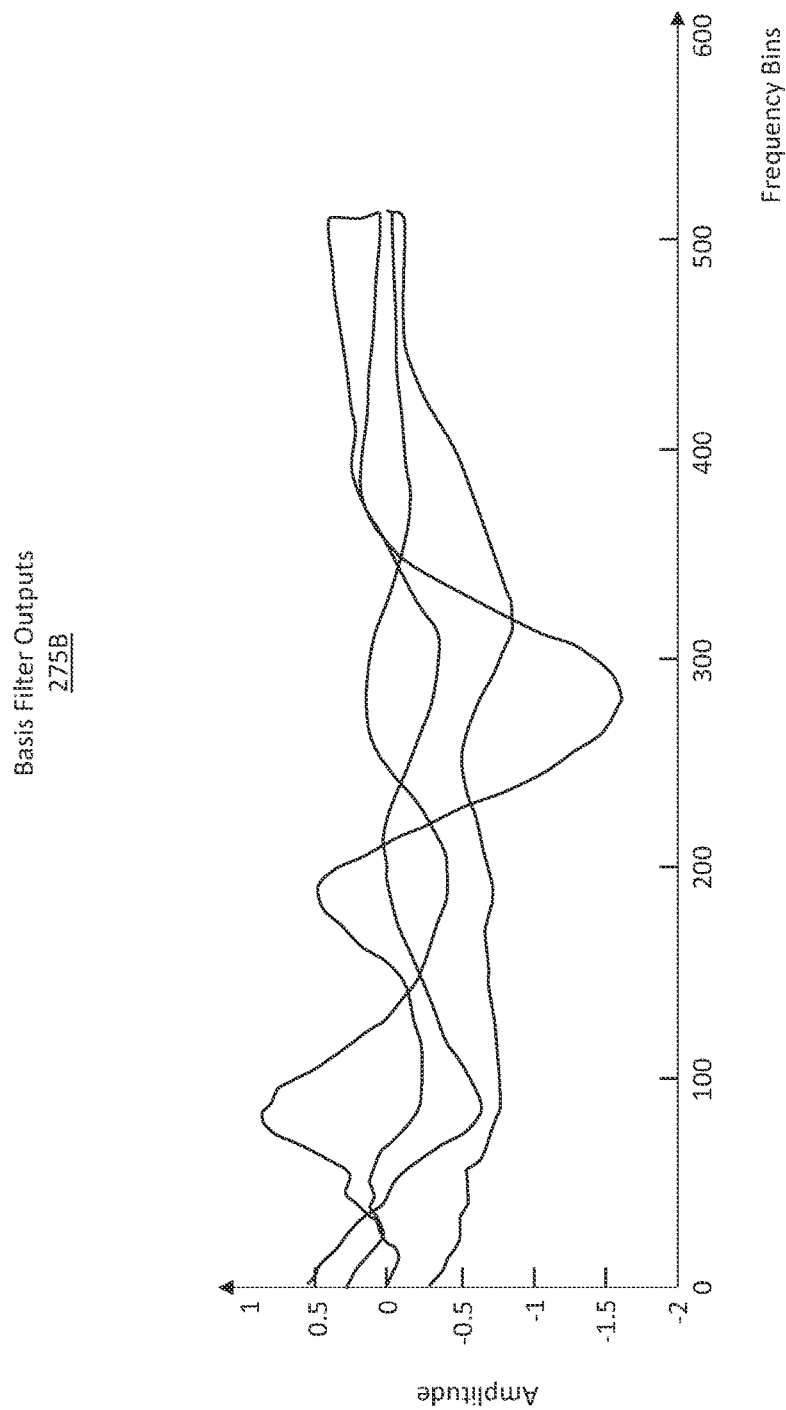

FIG. 2D shows the basis filter outputs 275B from the four different basis filters 225A, 225B, 225C, and 225D. Of course, this illustration is for example purposes only. The chart shows the outputs as they would appear in a linear frequency domain. Each line in the chart represents a single basis filter. In accordance with the disclosed principles, every HRTF filter can be represented as some linear combination of the four waveforms in FIG. 2D, along with the linear combination of the mixing channel filters that precede the basis filters. The embodiments are able to determine how much energy from each basis filter is to be used in order to linearly combine the signals to produce a resulting output. That is, the outputs of the basis filters can be linearly combined in a frequency domain. All the values are per HRTF filter, and the embodiments will obtain a different set of weightings for each one of these filters, which then provides some approximation that looks like the original HRTF filter the network is attempting to iteratively recreate.

Figure 2E:
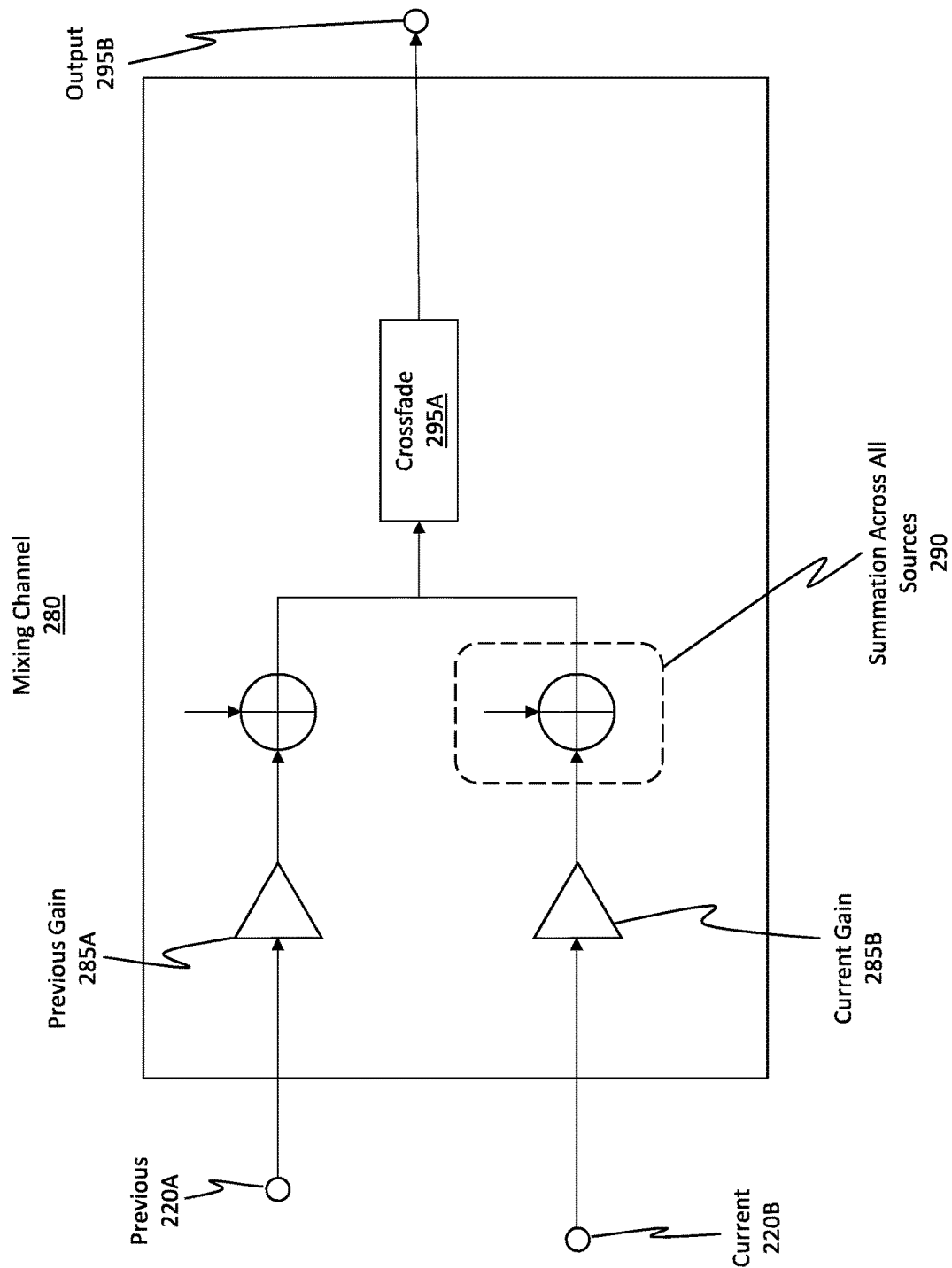

FIG. 2E illustrates the mixing channels from FIG. 2C in a more granular manner. Specifically, FIG. 2E shows a mixing channel 280, which is representative of any of the mixing channels 255A or 255B from FIG. 2C. The mixing channel 280 uses a set of gains, as shown by the previous gain 285A and the current gain 285B, to perform element-wise multiplication on the incoming audio signal. The previous gain 285A and the current gain 285B are included in the approximation data and are included in the gains 255C and 255D from FIG. 2C. The mixing channel 280 also performs a summation across all sources 290 operation, where the sources include the input signal.

As described previously, the term "sources" refers to distinct signals or channels, each with their own motion around the head. For instance, consider an MR system that is displaying multiple holograms for a user to view and interact with. It may be the case that each of those holograms has a corresponding sound. In this scenario, therefore, the location where each hologram is placed can be considered a "source" (e.g., on the sound sphere).

Stated differently, in the context of a spatializer, a source is an object that has an audio signal and a position associated with it. When performing the rendering processes, multiple distinct sources can actually be rendered simultaneously. With the disclosed embodiments, each source can be associated with its own corresponding set of mixing channel gains, which might be independent from the gains of the other sources.

After acquiring the gains, the embodiments send a scaled copy of the audio from that source into the mixing channel that that specific gain corresponds to. In this context, the mixing channel 280 is able to take the scaled audio content of an additional source and sum it with the content that is already in the mixing channel. These mixing channels are shared by all sources, so when spatializing a source, there may already be a scaled signal (from a different source) in the mixing channel, which is why the embodiments sum instead of simply replacing it. The contents of these mixing channels is cleared out (set to all zeros) before rendering every requested block (frame) of audio. The mixing channel 280 then crossfades the signal, as shown by crossfade 295A to produce an output 295B.

Returning to FIG. 2C, the output from the mixing channel 255B is fed into the FIR filter 260. The embodiments are able to generate the set of coefficients 260A that are used to control the FIR filter 260. In some cases, the FIR filter 260 can be a fourth-order FIR filter such that it can have 5 coefficients. The FIR filter 260 is effectively a prefiltering stage for the FFT 270 of the basis filter 250.

The inclusion of the FIR filter 260 into the network enables the network to have an extra degree of freedom in steering the signal that is provided to the FFT 270. In practical terms, the inclusion of the FIR filter 260 operates as if an additional FFT were provided but does so without the additional cost of an FFT. In terms of computational cost, the FIR filter 260 is substantially less costly than the FFT 270. Further, the FIR filter 260 allows for fine-grained tuning in order to allow the signal to better fit within the shape 250A of the basis filter 250.

Accordingly, the network 200 described in FIGS. 2A-2E can be used to decompose an HRTF data set to generate approximation data. This decomposition process is an iterative process and is performed in order to determine an optimal set of approximation data, which includes a set of mixing channel gains, a set of FIR coefficients, and even shapes of the basis filters. The approximation data is iteratively learned and modified over time in order to produce an output (e.g., an approximated HRTF data set) that approximates the actual input HRTF data set. The embodiments determine whether the approximation data is sufficiently fine-tuned by identifying how closely the output approximated HRTF data set matches or aligns with the input HRTF data set (e.g., at a specific frequency or across a range of frequencies).

To determine how to iteratively modify the approximation data, the embodiments calculate an error metric between the output approximated HRTF data set and the input HRTF data set. The iterative processes are performed until the error metric is less than a threshold level (e.g., at a particular frequency or across a range of frequencies). Stated differently, the iterative learning includes iteratively modifying the approximation data until the error metric between the output approximated HRTF data set and the input HRTF data set is less than an error threshold. The approximated data is sparser as compared to the input HRTF data set. Later, the approximation data can then be used to drive the network when the network operates on an actual audio signal. FIGS. 3A through 3D show some example plots illustrating how the approximation data closely approximates the original HRTF data set. The error metric can be inferred or derived from these visualizations.

Figure 3A:
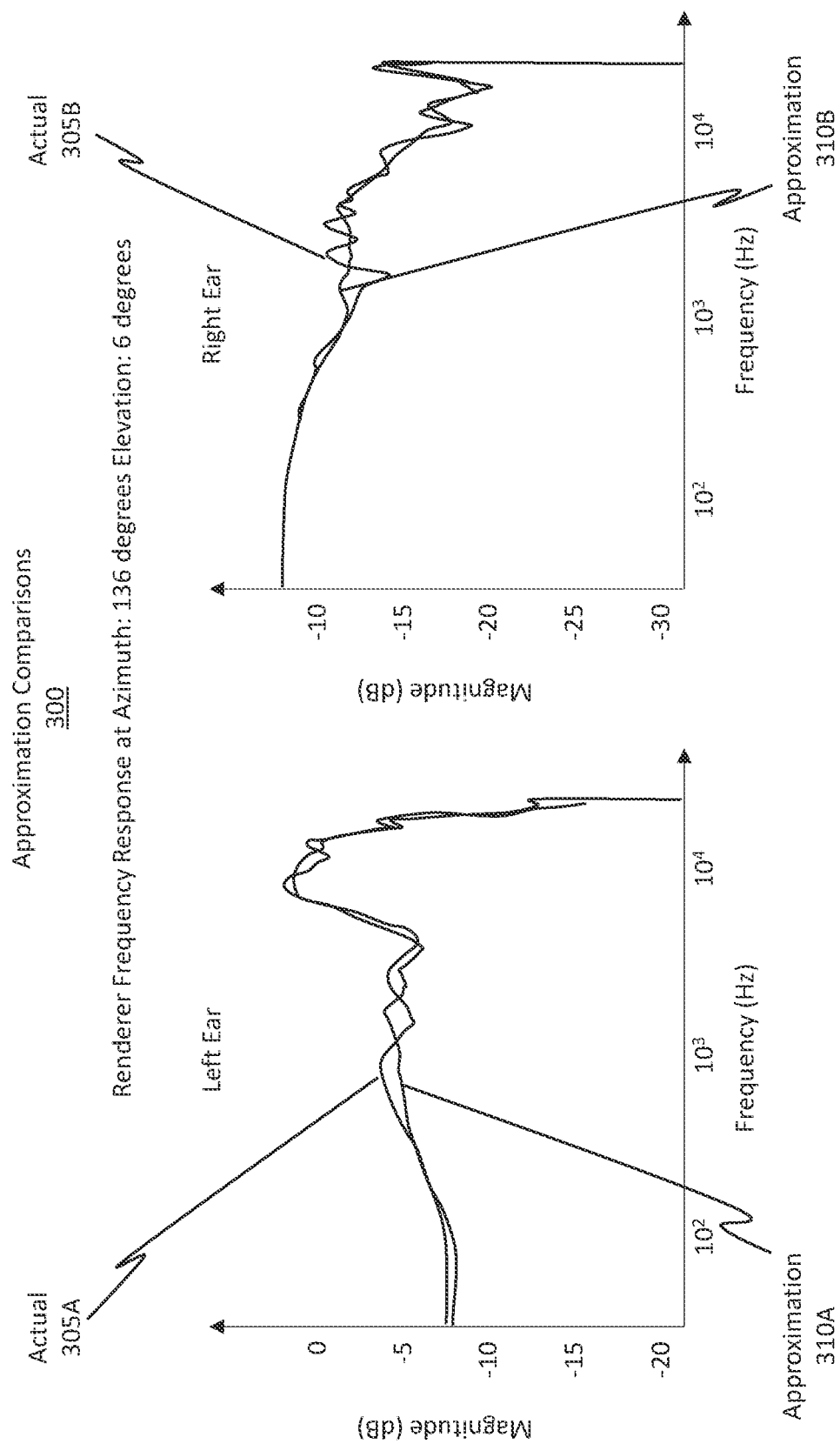
FIGS. 3A, 3B, 3C, and 3D illustrate various graphs showing how the approximated HRTF data set closely approximates the original HRTF data set. An error metric can be computed using an equation that operates on those two data sets to generate an output describing how close the approximated data set is to the original data set.

FIG. 3A shows a set of approximation comparisons 300 for a particular source or location on the sound sphere. The plot labeled actual 305A represents a plotted version of an actual input HRTF data set, such as perhaps the "input HRTF data set" mentioned throughout this document. The plot labeled approximation 310A represents a plotted version of the output approximated HRTF data set, which is generated when the network uses the fine-tuned approximation data to operate on the input HRTF data set.

The left-hand chart is data that corresponds to a user's left ear while the right-hand chart is data that corresponds to the user's right ear. The plot labeled actual 305B represents a plotted version of an actual input HRTF data set. The plot labeled approximation 310B represents a plotted version of the output approximated HRTF data set, which is generated when the network uses the fine-tuned approximation data to operate on the input HRTF data set.

Figure 3B:
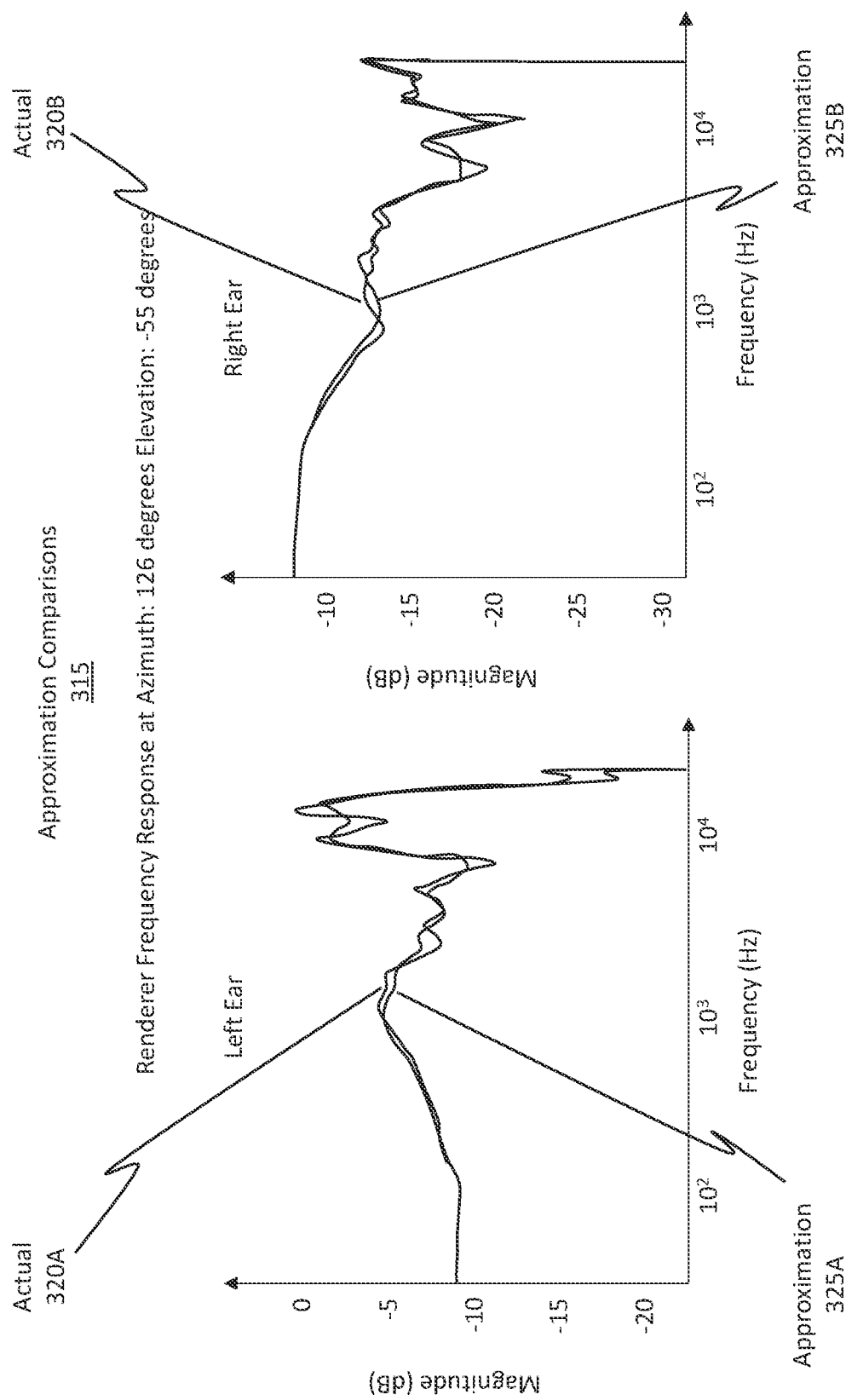

FIG. 3B shows another set of approximation comparisons 315 for a different source, location, or position along the sound sphere. These charts show an actual 320A and 320B signal, which is representative of the input HRTF data set at that source. Similarly, these charts show the approximation 325A and 325B, which are representative of output approximated HRTF data sets that would be produced by the network using the fine-tuned approximation data.

Figure 3C:
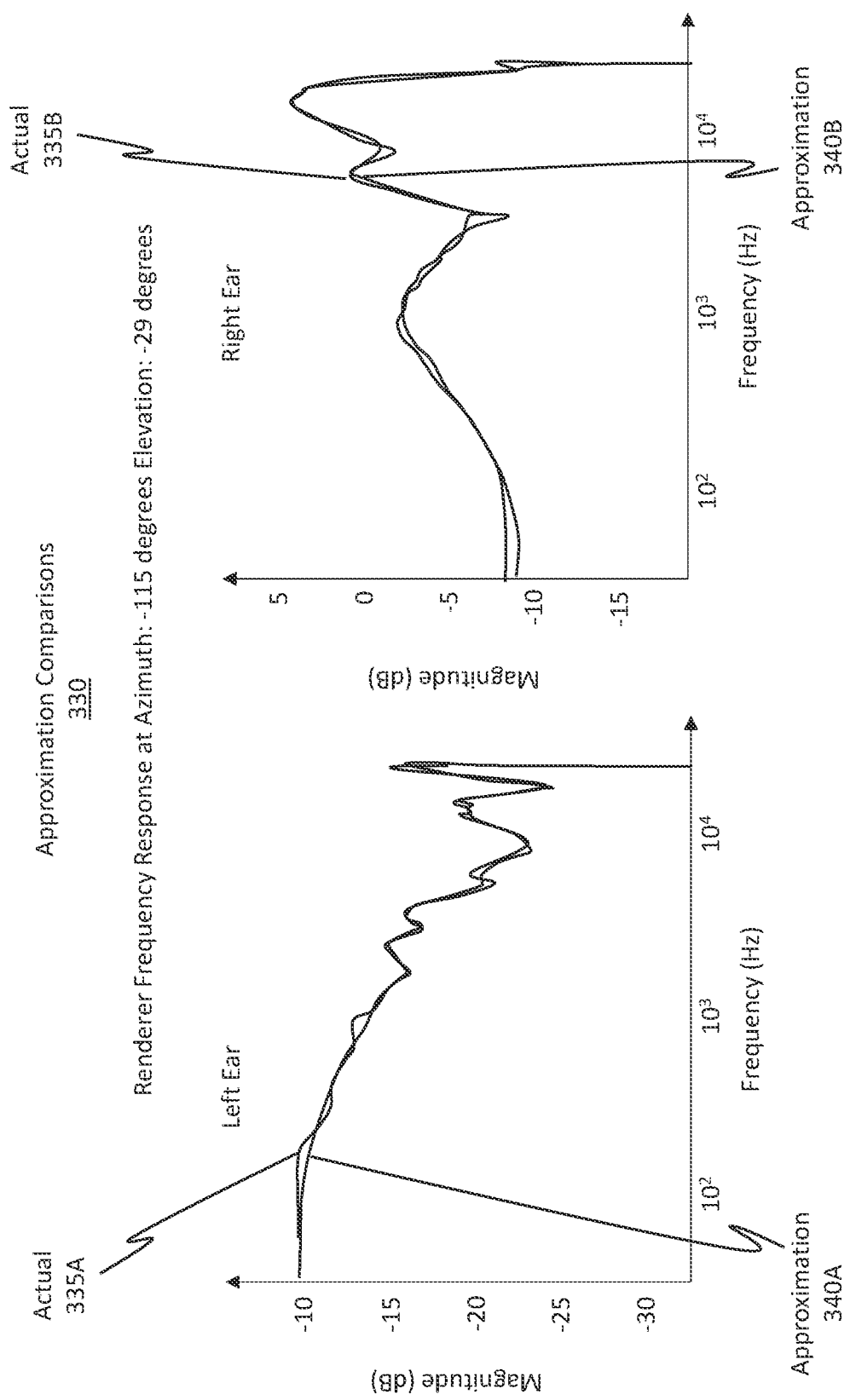

FIG. 3C shows another set of approximation comparisons 330 for a different source, location, or position along the sound sphere. These charts show an actual 335A and 335B signal, which is representative of the input HRTF data set. Similarly, these charts show the approximation 340A and 340B, which are representative of output approximated HRTF data sets that would be produced by the network using the fine-tuned approximation data.

Figure 3D:
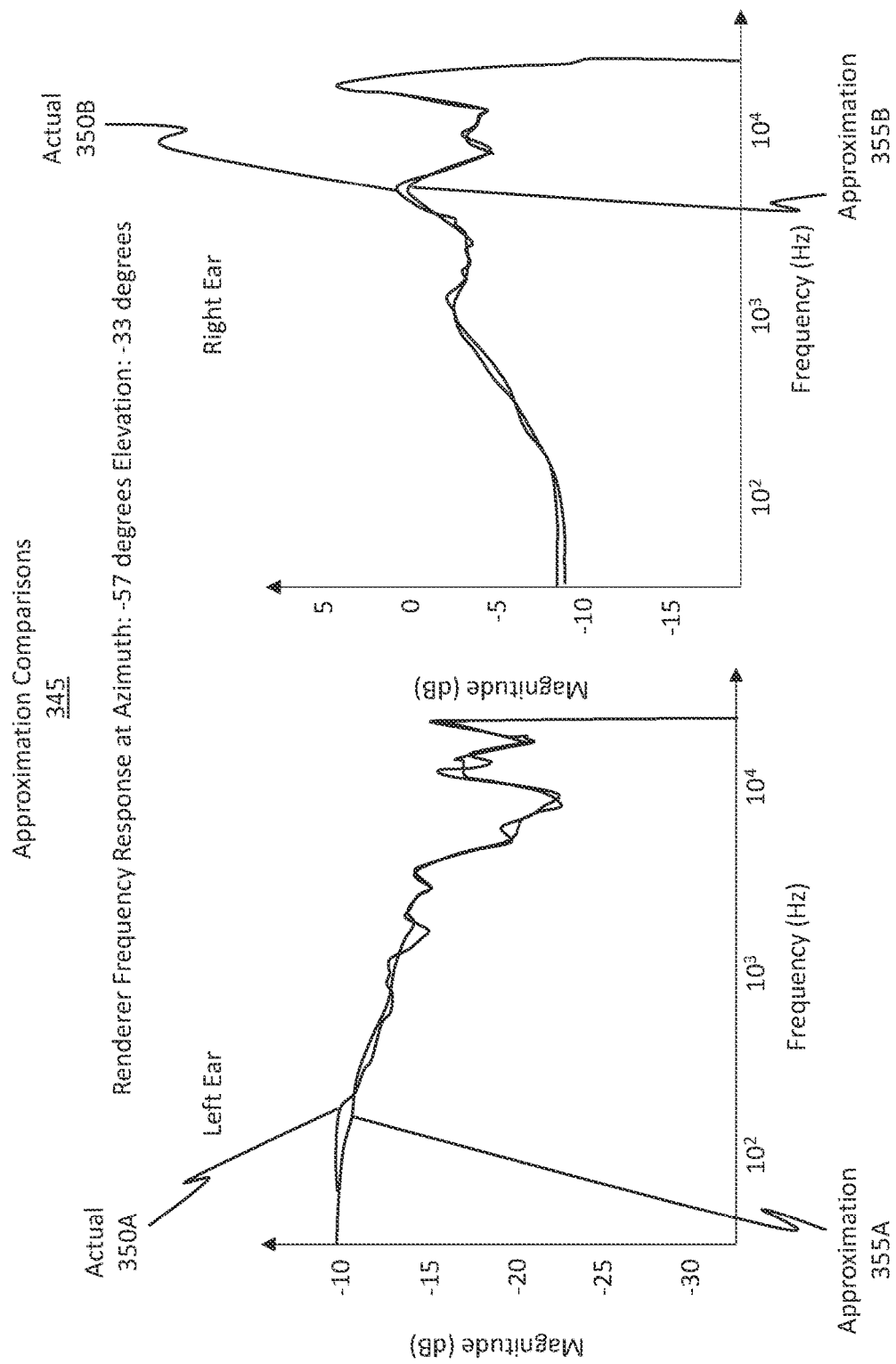

FIG. 3D shows another set of approximation comparisons 345 for a different source, location, or position along the sound sphere. These charts show an actual 350A and 350B signal, which is representative of the input HRTF data set. Similarly, these charts show the approximation 355A and 355B, which are representative of output approximated HRTF data sets that would be produced by the network using the fine-tuned approximation data. Notice, the error between the two plots is better or worse for various locations along the sound sphere. Notably, however, the amount of error is still within an acceptable threshold level, particularly for the frequencies of interest (i.e. those the user can sufficiently hear).

Example Decomposition Methods To Generate Approximation Data

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 4, which illustrates a flowchart of an example method 400 for approximating head related transfer function (HRTF) filters to reduce a per-source rendering cost when subsequently rendering an audio signal. Method 400 comprises a perceptual decomposition process in which an input HRTF data set is fed into a network and is used to generate approximation data, which drives components in the network. Notably, the network is configured to iteratively fine-tune the approximation data until an output (which includes an approximated HRTF data set) sufficiently matches the input HRTF data set. Method 400 can be implemented using the network 200 of FIG. 2A. Method 400 is focused on the perceptual decomposition process.

In particular method 400 includes an act (act 405) of providing the input HRTF data set as input into the network, which comprises basis filters that include mixing channels, finite input response (FIR) filters, and FFTs (e.g., a single FFT per basis filter). The input HRTF data set includes a corresponding set of HRTF filters for each location in a sound sphere.

In some cases, the network includes a per-source section comprising the mixing channels. In some cases, the network further includes a fixed-compute section comprising the FIR filters and the FFTs of the basis filters. As such, the FFTs are included in only the fixed-compute section.

In some example cases, the network includes 8 mixing channels per ear. In some example cases, the network can be a 2-5-4 network that includes 2 mixing channels, 5 coefficients per FIR filter, and 4 basis filters. Of course, one will appreciate how different values can be used as a result of the network being highly scalable.

For each respective location in the sound sphere, act 410 includes causing the network to use the input HRTF data set to iteratively learn approximation data comprising the following: (i) corresponding mixing channel gains that are used to control input to the mixing channels, (ii) coefficients that are used to control the FIR filters, and (iii) shapes of the basis filters. Notably, specific combinations of mixing channel gains as well as the FIR coefficients and linear combinations of outputs from the basis filters cause the network to generate an output that corresponds to the input HRTF data set. That is, the output is an output approximated HRTF data set. The iterative learning attempts to minimize an error metric between the output approximated HRTF data set and the input HRTF data set by iteratively modifying the approximation data.

By way of additional clarification, the approximation data (e.g., the mixing channel gains, coefficients, and basis filter shapes) are iteratively fine tuned in order to cause the output approximated HRTF data set to closely match the original HRTF data set (e.g., at least at a particular frequency or across a range of frequencies). By "closely match," it is meant that an error metric between the original input HRTF data set and the output approximated HRTF data set is less then a threshold level of error. By iteratively fine-tuning the approximation data, the embodiments are beneficially able to generate a corresponding set of approximation data for each source or each location on the sound sphere. Later, when an actual audio signal is rendered using the network and using specific approximation data corresponding to the location of the source for that audio signal, the rendering process will produce an output that is similar (e.g., within a threshold level of similarity) to an output that would have been generated if actual HRTF filters were used to process the audio signal.

Act 415 then includes storing a 1:1 correlation between each location in the sound sphere and specific values selected from the approximation data. By subsequently selecting a particular location in the sound sphere, a corresponding set of values from the approximation data are also selected, where these corresponding set of values include specific mixing channel gains, the coefficients, and the basis filter shapes. When selecting a particular location, the values that are specific to that location include the mixing channel gains. The FIR coefficients and the basis filters can remain constant regardless of position.

In this sense, the embodiments derive a set of approximation data based directly on the HRTF data. That approximation data can then be used to drive various components (e.g., mixing channels, FIR filters, shapes of the basis filters, etc.) when rendering an audio signal. That is, after the decomposition process, the network can be used to render an audio signal. This audio signal will correspond to a source or a location on the sound sphere. The embodiments can determine that location and then select the specific set of approximation data (e.g., mixing channel gains, the coefficients, and the basis filter shapes) that correspond to that specific location. This selected approximation data can then be used to configure or drive the components in the network in order to properly render the audio signal so that the audio signal will be rendered or played as if the audio signal actually originated at the location on the sound sphere.

In this sense, the approximation data includes multiple mixing channel gains, multiple coefficients, and multiple basis filter shapes (e.g., specific values for each location on the sound sphere). Furthermore, use of the approximation data (e.g., when the input is the HRTF data set) generates approximated HRTFs, and the approximation data is iteratively modified until an error metric between the approximated HRTFs and the actual HRTFs is less than an error threshold. The approximation data is much sparser as compared to actual HRTF filters.

Optionally, method 400 can further include rendering an input audio signal that is fed into the network. In some implementations, the rendering includes identifying a specific location in the sound sphere and, based on the specific location in the sound sphere, selecting a particular set of mixing channel gains from the approximation data, selecting a particular set of coefficients from the approximation data, and selecting a particular set of basis filter shapes from the approximation data.

The rendering process can further include configuring the network based on the selected particular set of mixing channel gains, based on the selected particular coefficients, and based on the selected particular set of basis filter shapes. After configuring the network, the method can include an act of feeding the input audio signal as input into the network.

The network can then be caused to generate a left output signal and a right output signal. The left output signal and the right output signal can then be played over a pair of speakers.

Methods For Rendering An Audio Signal Using Approximation Data

Figure 4:
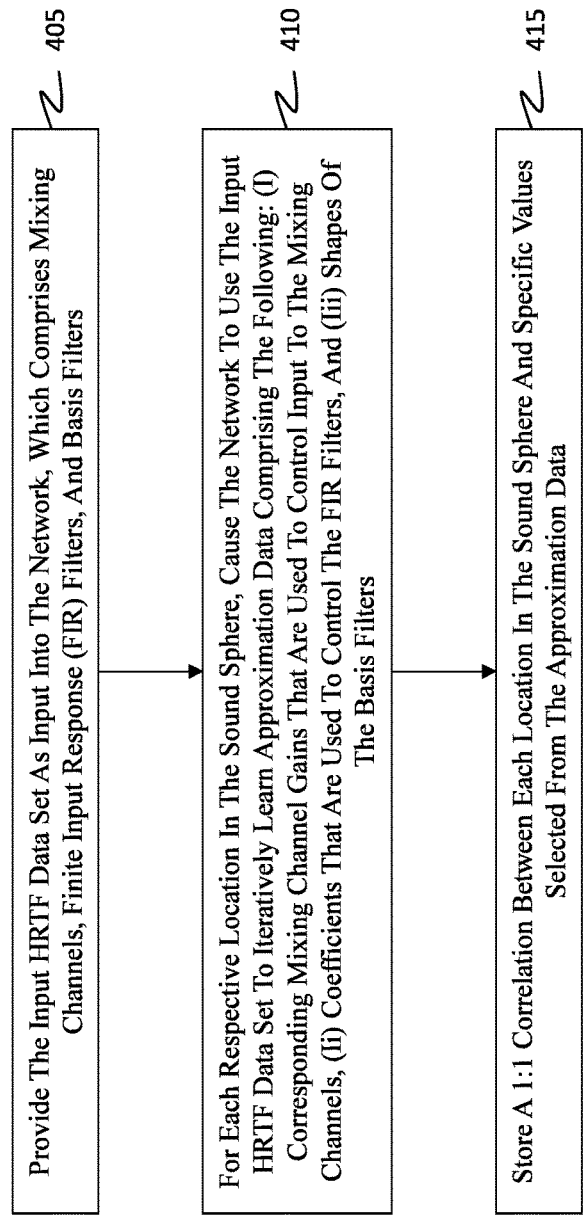
FIG. 4 illustrates a flowchart of an example method for decomposing an HRTF data set to generate approximation data.
Figure 5:
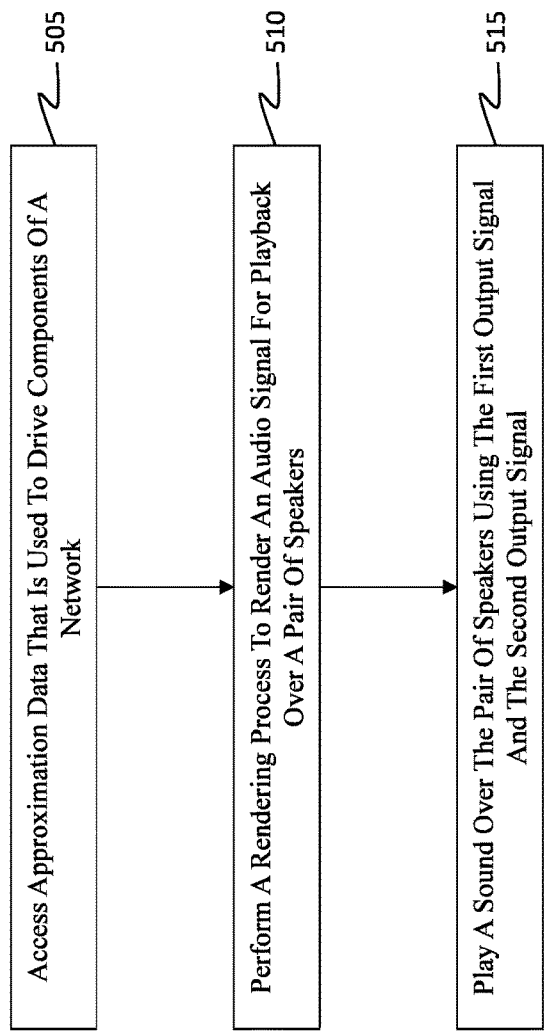
FIG. 5 illustrates a flowchart of an example method for rendering an audio signal using the approximation data that was previously generated.

Attention will now be directed to FIG. 5, which illustrates a flowchart of an example method 500 for rending an audio signal using approximation data that was generated during a perceptual decomposition process in which a head related transfer function (HRTF) data set was decomposed (e.g., the approximation data generated by method 400 of FIG. 4). That is, method 500 is performed after method 400 of FIG. 4 is performed. Furthermore, method 500 can also be performed using the network 200 of FIG. 2A. Whereas network 200 used an HRTF data set as the input 200A to decompose the HRTF data set, when the method 500 is performed, the network 200 uses an audio signal associated with a particular source or position on the sound sphere as the input 200A.

Initially, method 500 includes an act (act 505) of accessing approximation data that is used to drive components of a network. The approximation data was generated via an iterative learning process in which an input HRTF data set was fed as input into the network and in which the approximation data was used by the network to generate an output approximated HRTF data set. The approximation data was iteratively fine-tuned by the network until an error metric between the output approximated HRTF data set and the input HRTF data set was below an error threshold. The approximation data includes (i) mixing channel gains that are used to control mixing channels of the network, (ii) coefficients that are used to control finite input response (FIR) filters of the network, and (iii) shapes of basis filters of the network.

Act 510 includes performing a rendering process to render an input audio signal for playback over a pair of speakers. Notably, the input audio signal is fed as input into the network. The rendering process is described in FIG. 6.

Figure 6:
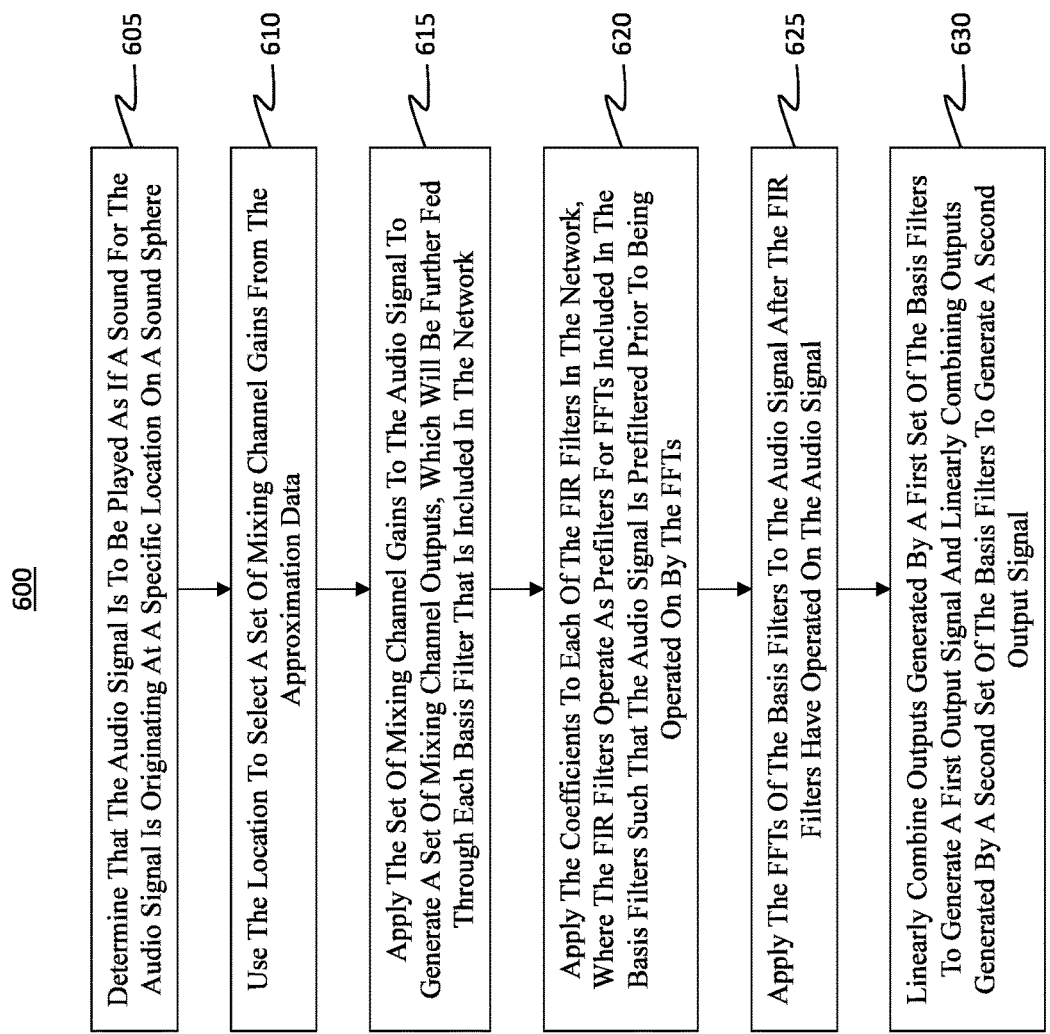
FIG. 6 illustrates another flowchart describing the rendering process.

Specifically, FIG. 6 shows a rendering method 600 that includes an act (act 605) of determining that the input audio signal is to be played as if a sound for the input audio signal is originating at a specific location on a sound sphere.

Act 610 includes using the specific location to select a set of mixing channel gains from the approximation data. For example, as described earlier, each source or location on the sound sphere has associated with it a set of approximation data (e.g., mixing channel gains, coefficients, basis filter shapes). The approximation data for each source was generated as a result of performing method 400. The embodiments identify the source or location associated with the audio signal and then select the specific set of approximation data that was generated for that specific source.

Act 615 includes applying the set of mixing channel gains to the input audio signal to generate a set of mixing channel outputs, which will be further fed through each basis filter that is included in the network. In some cases, after applying the set of gains, the method further includes performing a summation across all sources and adding the summation to the set of mixing channels. The sources include the input audio signal as well as any other audio signals.

Act 620 includes applying the coefficients to each of the FIR filters in the network, where the FIR filters operate as prefilters for FFTs included in the basis filters such that the input audio signal is prefiltered prior to being operated on by the FFTs.

Act 625 includes applying the FFTs of the basis filters to the input audio signal after the FIR filters have operated on the input audio signal. Notably, the FFTs transform the input audio signal from the time domain to a frequency domain.

Act 630 includes linearly combining outputs generated by a first set of the basis filters to generate a first output signal and linearly combining outputs generated by a second set of the basis filters to generate a second output signal. By way of example, the left-ear processing 210A of FIG. 2A includes a set of four basis filters that operate to generate the left output 215A. These basis filters can be included in the "first set of basis filters." Similarly, the right-ear processing 210B includes a set of four basis filters that operate to generate the right output 215B. These basis filters can be included in the "second set of basis filters."

Although not illustrated in FIG. 6, the method 600 can further include an act of applying an IFFT to the signal after act 630 has been performed in order to transform the signal back into the time domain. Stated differently, after linearly combining the outputs generated by the first and/or second set of basis filters, the embodiments can further perform an IFFT to generate the first and second output signals.

Returning to FIG. 5, method 500 further includes an act (act 515) of playing a sound over the pair of speakers using the first output signal and the second output signal. As mentioned previously, the rendering process can be performed by the network 200 of FIG. 2A. Network 200 includes a per-source section in which the set of gains are applied to the audio signal (e.g., act 615). The network 200 further includes a fixed compute section in which acts 620, 625, and 630 of FIG. 6 are performed.

Accordingly, the embodiments beneficially resolve the issue of expensive spatialization in multi-source scenarios via the use of a novel binaural spatialization technique that closely approximates the perceptually relevant cues of a given ground truth HRTF dataset while reducing the per-source rendering cost. To compactly approximate these cues, there are two steps: the perceptual decomposition step and the rendering step in real-time. The embodiments minimize a perceptually motivated error metric between the approximated HRTF set (e.g., the output of the network) and the ground truth HRTF set (i.e. the input HRTF data set). By performing this minimization routine, the embodiments beneficially derive a process that will be used in real-time to drive the rendering step.

Generally, during the decomposition process, the embodiments process an input (i.e. the input HRTF data set) with a set of frequency-independent mixing matrices that vary over position, source, or location. The embodiments also process the input with a set of mixing channel filters that vary along frequency. The embodiments further process the input with FFTs included in a set of basis filters that are shared by all source positions. The embodiments sum across the outputs of the basis filters to produce the desired HRTF output.

In this network, both the mixing channel filters and the FFTs in the basis filters (as well as the basis filters themselves) work in tandem to reconstruct the HRTF dataset, with the mixing channel filters enabling higher degrees of freedom in the optimization process. Consequently, this reduces the number of overall basis filters (and FFTs) needed for accurate approximation.

In some example implementations, the mixing channel filters do not vary across position, and the output is a single channel of the HRTF. However, the disclosed embodiments can be extended to handle both position-dependent mixing channel filters as well as multi-channel representations of the HRTF dataset. Additionally, for any of the values that are attempting to be derived, the embodiments can optionally choose to constrain or pre-define some of those values. For example, the embodiments can optionally constrain the mixing channel filters to have a constant magnitude in the frequency domain.

The rendering step involves the real-time digital signal processing (DSP) required to take an incoming audio signal and to spatialize it to be played back over headphones. The renderer's architecture closely resembles the network used in the perceptual decomposition step. Optionally, in this rendering architecture, the mixing channel filters can be static. The mixing channel filters are also computationally more efficient as compared to the FFTs.

Accordingly, the disclosed embodiments beneficially use a new technique to derive approximation data, which is used to drive various components of a network. This approximation data is derived directly from HRTF data.

Example Computer/Computer systems

Attention will now be directed to FIG. 7 which illustrates an example computer system 700 that may include and/or be used to perform any of the operations and/or methods described herein. Computer system 700 may take various different forms. For example, computer system 700 may be embodied as a tablet 700A, a desktop or a laptop 700B, a wearable device (e.g., an HMD 700C), a mobile device, or any other standalone device as represented by the ellipsis 700D. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "engine", or perhaps even the "networks" described in FIGS. 1 through 2E can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions 715. The executable instructions 715 represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices or cloud services to obtain or process data. In some cases, network 720 may itself be a cloud network. Furthermore, computer system 700 may also be connected through one or more wired or wireless network to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for approximating head related transfer function (HRTF) filters to reduce a per-source rendering cost when subsequently rendering an audio signal, said method comprising a perceptual decomposition process in which an input HRTF data set is fed into a network and is used to generate approximation data, which drives components in the network, the network is configured to iteratively fine-tune the approximation data until an output comprising an approximated HRTF data set sufficiently matches the input HRTF data set, wherein the perceptual decomposition process includes:
   providing the input HRTF data set as input into the network, which comprises basis filters that include mixing channels, finite input response (FIR) filters, and Fast Fourier Transforms (FFTs), wherein the input HRTF data set includes a corresponding set of HRTF filters for each location in a set of locations;
   for each respective location in the set of locations, causing the network to use the input HRTF data set to iteratively learn approximation data comprising the following: (i) corresponding mixing channel gains that are used to control input to the mixing channels, (ii) coefficients that are used to control the FIR filters, and (iii) shapes of the basis filters, wherein:
      specific combinations of mixing channel gains, coefficients, and linear combinations of outputs from the basis filters cause the network to generate the output that corresponds to the input HRTF data set, the output being the output approximated HRTF data set, and
      the iterative learning attempts to minimize an error metric between the output approximated HRTF data set and the input HRTF data set by iteratively modifying the approximation data; and
   storing a 1:1 correlation between each location in the set of locations and specific values selected from the approximation data, wherein:
      by subsequently selecting a particular location in the set of locations, a corresponding set of values from the approximation data are also selected, said corresponding set of values include specific mixing channel gains, the coefficients, and the basis filter shapes.

2. The method of claim 1, wherein said method further includes rendering an input audio signal that is fed into the network by:
   identifying a specific location in the set of locations, where the specific location corresponds to the input audio signal;
   based on the specific location, selecting a particular set of mixing channel gains from the approximation data, selecting the coefficients from the approximation data, and selecting the basis filter shapes from the approximation data;
   configuring the network based on the selected particular set of mixing channel gains, based on the coefficients, and based on the basis filter shapes;
   after configuring the network, feeding the input audio signal as input into the network;
   causing the network to generate a left output signal and a right output signal based on the input audio signal; and
   playing the left output signal and the right output signal over a pair of speakers.

3. The method of claim 1, wherein each basis filter in said basis filters includes a single Fast Fourier Transform (FFT).

4. The method of claim 1, wherein:
   the network includes a per-source section comprising the mixing channels,
   the network further includes a fixed-compute section comprising the FIR filters and the FFTs, and
   the FFTs are included in only the fixed-compute section.

5. The method of claim 1, wherein the network includes 8 mixing channels per ear.

6. The method of claim 1, wherein the network is a 2-5-4 network that includes 2 mixing channels, 5 coefficients per FIR filter, and 4 basis filters.

7. The method of claim 1, wherein outputs of the basis filters are linearly combined in a frequency domain.

8. The method of claim 1, wherein the iterative learning includes iteratively modifying the approximation data until the error metric between the output approximated HRTF data set and the input HRTF data set is less than an error threshold.

9. The method of claim 8, wherein the approximated data is sparser as compared to the input HRTF data set.

10. A method for rending an audio signal using approximation data that was generated during a perceptual decomposition process in which a head related transfer function (HRTF) data set was decomposed, said method comprising:
   accessing approximation data that is used to drive components of a network, wherein the approximation data was generated via an iterative learning process in which an input HRTF data set was fed as input into the network and in which the approximation data was used by the network to generate an output approximated HRTF data set, wherein the approximation data was iteratively fine-tuned by the network until an error metric between the output approximated HRTF data set and the input HRTF data set was below an error threshold, and wherein the approximation data includes (i) mixing channel gains that are used to control mixing channels of the network, (ii) coefficients that are used to control finite input response (FIR) filters of the network, and (iii) shapes of basis filters of the network;
   performing a rendering process to render an input audio signal for playback over a pair of speakers, the input audio signal being fed as input into the network, wherein the rendering process includes:
      determining that the input audio signal is to be played as if a sound for the input audio signal is originating at a specific location;
      using the specific location to select a set of mixing channel gains from the approximation data;
      applying the set of mixing channel gains to the input audio signal to generate a set of mixing channel outputs, which will be further fed through each basis filter that is included in the network;
      applying the coefficients to each of the FIR filters in the network, wherein the FIR filters operate as prefilters for Fast Fourier Transforms (FFTs) included in the basis filters such that the input audio signal is prefiltered prior to being operated on by the FFTs;
      applying the FFTs of the basis filters to the input audio signal after the FIR filters have operated on the input audio signal; and
      linearly combining outputs generated by a first set of the basis filters to generate a first output signal and linearly combining outputs generated by a second set of the basis filters to generate a second output signal; and playing a sound over the pair of speakers using the first output signal and the second output signal.

11. The method of claim 10, wherein after applying the set of gains, the method further includes:
performing a summation across a plurality of sources, which includes the input audio signal, and adding the summation to the set of mixing channels.

12. The method of claim 10, wherein, after linearly combining the outputs generated by the first set of basis filters, the method further includes performing an inverse FFT (IFFT) to generate the first output signal.

13. The method of claim 10, wherein, after linearly combining the outputs generated by the second set of basis filters, the method further includes performing an inverse FFT (IFFT) to generate the second output signal.

14. The method of claim 10, wherein the first output signal is played over a left speaker on a head mounted device (HMD), and wherein the second output signal is played over a right speaker on the HMD.

15. The method of claim 10, wherein the rendering process is performed by a network that includes a per-source section in which the set of gains are applied to the audio signal, and wherein the network further includes a fixed compute section.

16. A computer system configured to approximate head related transfer function (HRTF) filters to reduce a per-source rendering cost when subsequently rendering an audio signal, the computer system being further configured to perform a perceptual decomposition process in which an input HRTF data set is fed into a network and is used to generate approximation data, which drives components in the network, the network is configured to iteratively fine-tune the approximation data until an output comprising an approximated HRTF data set sufficiently matches the input HRTF data set, wherein the computer system includes:
one or more processors; and
one or more hardware storage devices that store instructions that are executable by the one or more processors to cause the computer system to perform the perceptual decomposition process, which includes:
providing the input HRTF data set as input into the network, which comprises basis filters that include mixing channels, finite input response (FIR) filters, and Fast Fourier Transforms (FFTs), wherein the input HRTF data set includes a corresponding set of HRTF filters for each location;
for each respective location, causing the network to use the input HRTF data set to iteratively learn approximation data comprising the following: (i) corresponding mixing channel gains that are used to control input to the mixing channels, (ii) coefficients that are used to control the FIR filters, and (iii) shapes of the basis filters, wherein:
specific combinations of mixing channel gains, the coefficients, and linear combinations of outputs from the basis filters cause the network to generate an output that corresponds to the input HRTF data set, the output being an output approximated HRTF data set, and
the iterative learning attempts to minimize an error metric between the output approximated HRTF data set and the input HRTF data set by iteratively modifying the approximation data; and
storing a 1:1 correlation between each location and specific values selected from the approximation data, wherein:
by subsequently selecting a particular location, a corresponding set of values from the approximation data are also selected, said corresponding set of values include specific mixing channel gains, the coefficients, and the basis filter shapes.

17. The computer system of claim 16, wherein the network is further used to render a particular audio signal.

18. The computer system of claim 16, wherein each basis filter in said basis filters includes a single FFT.

19. The computer system of claim 16, wherein the network includes 8 mixing channels per ear.

20. The computer system of claim 16, wherein outputs of the basis filters are linearly combined in a frequency domain.

* * * * *